United States Patent
Liebson et al.

(10) Patent No.: US 8,997,796 B2
(45) Date of Patent: Apr. 7, 2015

(54) DURABLE SEMI-RIGID SINGLE-LAYER FLEXIBLE DUCT

(71) Applicants: Steven Allan Liebson, Ein Sarid (IL); Graeme Anthony Liebson, Ein Sarid (IL); Robert Cohen, Ein Sarid (IL)

(72) Inventors: Steven Allan Liebson, Ein Sarid (IL); Graeme Anthony Liebson, Ein Sarid (IL); Robert Cohen, Ein Sarid (IL)

(*) Notice: Subject to any disclaimer, the term of this patent is extended or adjusted under 35 U.S.C. 154(b) by 132 days.

(21) Appl. No.: 13/740,204

(22) Filed: Jan. 13, 2013

(65) Prior Publication Data

US 2013/0153076 A1 Jun. 20, 2013

Related U.S. Application Data

(63) Continuation of application No. 12/692,612, filed on Jan. 24, 2010, now Pat. No. 8,469,062.

(51) Int. Cl.
*F16L 11/00* (2006.01)
*F16L 11/24* (2006.01)
*B21C 37/15* (2006.01)
*D06F 58/20* (2006.01)
*F16L 11/08* (2006.01)
*F16L 11/112* (2006.01)
*F24F 13/02* (2006.01)

(52) U.S. Cl.
CPC .............. *F16L 11/24* (2013.01); *B21C 37/154* (2013.01); *D06F 58/20* (2013.01); *F16L 11/081* (2013.01); *F16L 11/112* (2013.01); *F24F 13/0218* (2013.01)

(58) Field of Classification Search
USPC .................. 138/125, 127, 131, 133, 134, 149; 428/36.91
See application file for complete search history.

(56) References Cited

U.S. PATENT DOCUMENTS

| | | | |
|---|---|---|---|
| 2,590,196 A | | 3/1952 | Messinger |
| 2,636,083 A | * | 4/1953 | Phillips et al. ................ 333/241 |
| 2,858,854 A | | 11/1958 | Daggett |
| 3,240,234 A | | 3/1966 | Bond, Jr. et al. |
| 3,554,237 A | | 1/1971 | Pelley et al. |
| 3,674,056 A | * | 7/1972 | D'Aprile ....................... 138/134 |
| 3,861,022 A | | 1/1975 | Hildebrandt et al. |
| 3,945,867 A | | 3/1976 | Heller et al. |
| 4,452,280 A | * | 6/1984 | Werner ......................... 138/131 |
| 4,489,759 A | | 12/1984 | Yamamura |
| 4,521,368 A | | 6/1985 | Mercer et al. |
| 4,570,679 A | | 2/1986 | Schippl |

(Continued)

FOREIGN PATENT DOCUMENTS

GB 1142471 5/1969

*Primary Examiner* — James Hook
(74) *Attorney, Agent, or Firm* — Edward Langer

(57) ABSTRACT

A durable, semi-rigid, single-layered flexible duct having a sleeve made of a single aluminum layer and a resilient wound element disposed at the mid-point of the overlap region of the aluminum layer. The wound element imparts corrugations to the sleeve, such that the duct is extendible between a compacted configuration suitable for storage and for shipping and an extended configuration suitable for installation in a gas transport arrangement. Closely and evenly-spaced ridges that are situated in between the corrugations, add rigidity and durability to the duct. The inward-facing surface of the aluminum ribbon is substantially smooth and featureless except for the helical corrugations imparted by wire winding and the closely and evenly-spaced ridges. The aluminum sleeve is of a predetermined thickness rendering the duct substantially rigid when in an extended configuration and enabling the duct to maintain its substantial rigidity upon extension from a compacted configuration.

27 Claims, 28 Drawing Sheets

(56) References Cited

U.S. PATENT DOCUMENTS

| | | | |
|---|---|---|---|
| 4,598,739 A * | 7/1986 | Burcher | 138/135 |
| 4,875,298 A | 10/1989 | Wright | |
| 5,042,172 A | 8/1991 | Foco et al. | |
| 5,062,219 A | 11/1991 | Harris et al. | |
| 5,085,251 A | 2/1992 | Popelka et al. | |
| 5,121,498 A | 6/1992 | Gilbert et al. | |
| 5,121,948 A | 6/1992 | Anderson et al. | |
| 5,133,579 A | 7/1992 | Anderson et al. | |
| 5,145,217 A | 9/1992 | Anderson et al. | |
| 5,182,147 A | 1/1993 | Davis | |
| 5,277,210 A | 1/1994 | Kim | |
| 5,281,187 A | 1/1994 | Whitney | |
| 5,341,827 A | 8/1994 | Kim | |
| 5,526,849 A | 6/1996 | Gray et al. | |
| 5,970,623 A | 10/1999 | Tuggle | |
| 6,000,435 A | 12/1999 | Patel et al. | |
| 6,003,561 A | 12/1999 | Brindza et al. | |
| 6,105,621 A | 8/2000 | Primich | |
| 6,186,181 B1 | 2/2001 | Schippl et al. | |
| 6,280,320 B1 | 8/2001 | Paschke et al. | |
| 6,382,258 B1 | 5/2002 | Tanaka | |
| 6,390,510 B1 | 5/2002 | Tuggle, Jr. | |
| 6,457,237 B1 | 10/2002 | Mathews et al. | |
| 6,527,014 B1 | 3/2003 | Aubourg | |
| 6,815,026 B2 | 11/2004 | Philip | |
| 6,837,787 B2 | 1/2005 | Crook | |
| 8,469,062 B2 * | 6/2013 | Liebson et al. | 138/133 |
| 2003/0178080 A1 | 9/2003 | Schippl et al. | |
| 2004/0040609 A1 | 3/2004 | Oishi et al. | |
| 2004/0121718 A1 | 6/2004 | Grochowski | |
| 2006/0051547 A1 | 3/2006 | Lim et al. | |
| 2007/0220732 A1 | 9/2007 | Liebson | |
| 2007/0235101 A1 | 10/2007 | Liebson | |
| 2008/0041483 A1 * | 2/2008 | Donnelly | 138/122 |
| 2010/0154914 A1 | 6/2010 | Liebson | |

\* cited by examiner

A-A

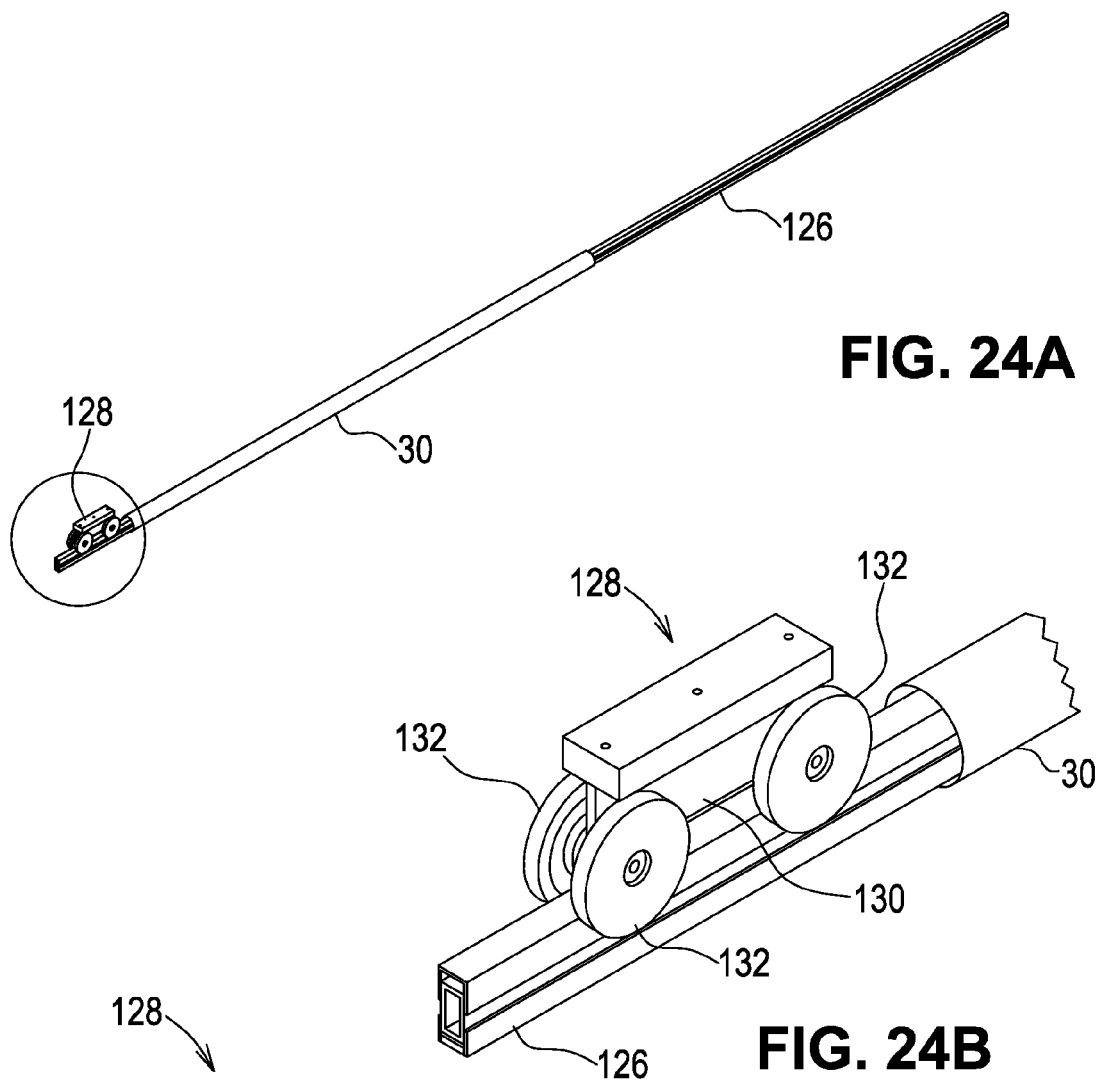
FIG. 24A
FIG. 24B
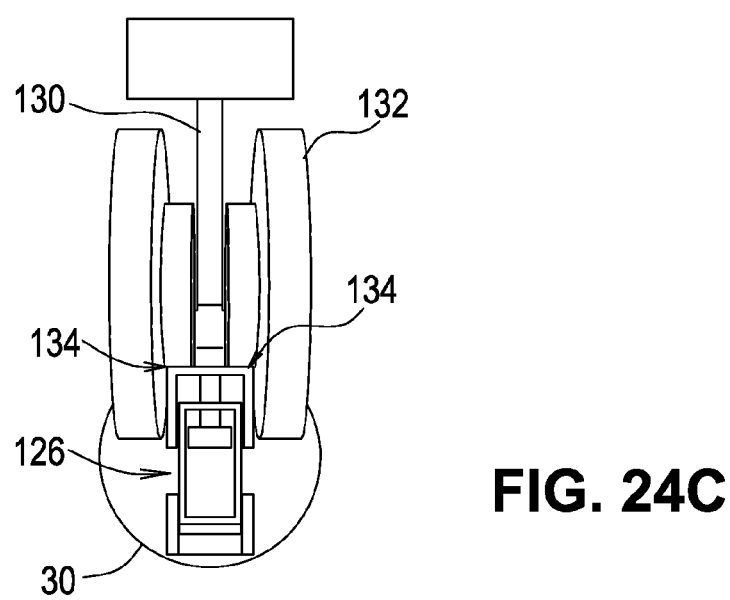
FIG. 24C

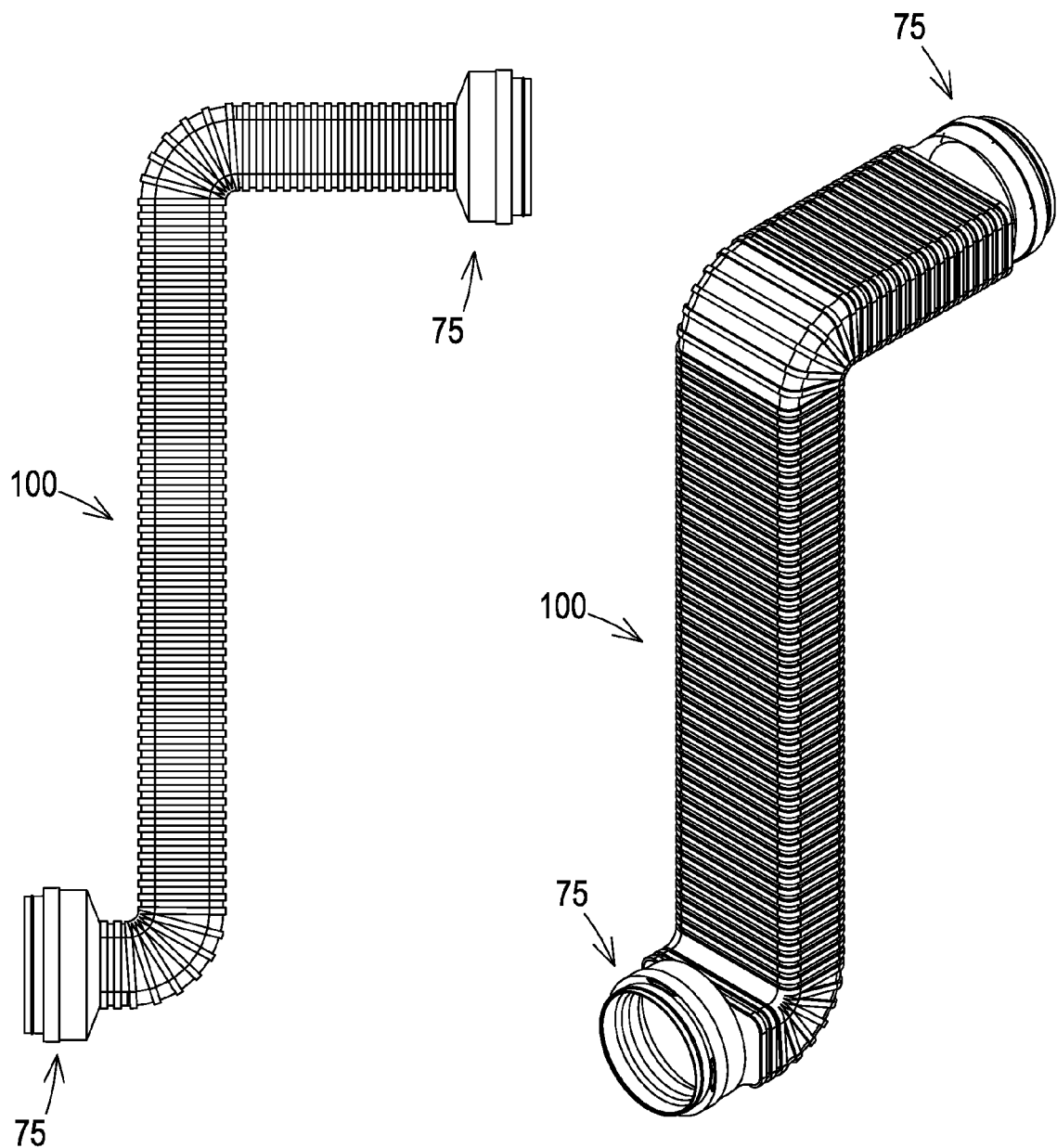
FIG. 25B  FIG. 25A

DURABLE SEMI-RIGID SINGLE-LAYER FLEXIBLE DUCT

REFERENCE TO CO-PENDING APPLICATIONS

The present application is a continuation-in-part of U.S. patent application Ser. No. 12/692,612 entitled "Durable Semi-Rigid Flexible Duct", filed Jan. 24, 2010, which is a continuation-in-part of U.S. patent application Ser. No. 12/645,517 entitled "Semi-Rigid Flexible Duct", filed Dec. 23, 2009, which is a continuation-in-part of U.S. patent application Ser. No. 11/717,411 entitled "Semi-Rigid Flexible Duct", filed Mar. 13, 2007, which is a continuation-in-part of U.S. patent application Ser. No. 11/389,623, entitled "Flexible Semi-Rigid Clothes Dryer Duct", filed Mar. 24, 2006, the contents of which are incorporated herein by reference.

FIELD OF THE INVENTION

The present invention relates to ducts, particularly semi-rigid flexible ducts.

BACKGROUND OF THE INVENTION

Ducts are used for different purposes, including for the conveyance of air, such as in ventilation, heating and cooling systems, or for conveying away exhaust gas from clothes dryers or other similar machines, as well as for carrying electrical cables and wiring, or other utilities.

When used for air conditioning or ventilation systems, such as within suspended ceilings, particularly in industrial and office premises, the ducts are circular and must be supported, as they have little self-support.

A further, very well known use of ducts is an exhaust vent for clothes dryers, in which the duct is fabricated of a resilient wire helix covered with vinyl or aluminum tubing. Both type of ducts lack structural integrity, while the vinyl-covered duct is not flame resistant. The lack of structural integrity of these ducts typically results in sagging and crinking thereof, causing the duct, over time, to become lined with lint from the clothes dried in the dryer, posing a fire hazard. In the United States alone, thousands of fires associated with clothes dryers occur, causing deaths and injuries and millions of dollars in damages. It is generally recommended by clothes dryer manufacturers not to use vinyl ducts such as these for dryer exhaust transition ducts.

Representative of the prior art in ventilation systems is U.S. Pat. No. 5,281,187 to Whitney, for a "Unitary Vent and Duct Assembly" which discloses a "semi-rigid flexible duct" for a ventilation system installed with a suspended ceiling structure. The duct taught in this patent is actually a solid aluminum tube which is corrugated or "accordion-folded" so that it can be compressed or compacted for storage or shipping. The corrugated aluminum tube duct taught therein, is meant to be coupled to a duct assembly of which it is an integral part, which is intended only for installation within a framed section of a suspended or dropped ceiling. However, once such a tube has been compressed and then re-extended for installation, it is unlikely to maintain its rigidity, depending on the thickness of the aluminum. A tube of this type maintains its rigidity by virtue of its being fabricated of solid metal, is heavy and expensive and can be unwieldy to install. The corrugated aluminum, when extended after compression, has significant ridges and other obtrusive topographical features along its interior due to the corrugations, which cause frictional resistance to the air flow within, a further disadvantage.

Corrugated aluminum is also employed for the exhaust vent of clothes dryers, as, for example, in U.S. Pat. Nos. 5,121,948, 5,133,579, and 5,145,217, which solve the above-described problem of insufficient rigidity, but by using totally rigid segments. Even though the aluminum tubing itself is clearly fire resistant, the ridges and other internal topographical features similar to those mentioned hereinabove with respect to the Whitney patent, also cause frictional resistance to the air flow within, permitting accumulation of lint, which, as stated hereinabove, presents a fire hazard.

U.S. Pat. No. 5,526,849, included herein by reference, to Gray for a "Flexible Duct" discloses a duct and a method for manufacture thereof. The duct disclosed therein is formed of plastic tapes wound on a rotating mandrel with a wire resilient helix and a yarn helix therebetween. The duct so produced, while flame resistant, has rigidity limited to that provided by the wire helix. The additional yarn helix complicates the manufacturing process and adds to the internal topographical features of the duct, increasing friction and the possibility of lint accumulation therein, as described above.

The shape of ducts also has significance. Relatively heavy, rectangular metal ducts, formed of heavy gauge sheet metal, are often used for heating and cooling systems in industrial and office premises. A rectangular cross-sectional shape is desired due to the possibility of placing the duct against a support surface, and thereby utilizing available space more efficiently than a circular duct. These ducts are limited, however, in length, due to their relatively heavy weight and rigidity, as well as to transportation considerations. Accordingly, several lengths of these ducts may need to be joined together on site in order to provide adequate lengths of duct. It will be appreciated that they also require sufficiently strong hangers and other mechanical supports to be provided so as to provide adequate support. Furthermore, specially made corner portions must be provided to take account of bends.

A further consideration that must be taken into account when installing exhaust ducts for directing exhaust gases from machines, is the fact that the exhaust vents (or in the case of air conditioning units, the cool air supply vents) often have a square or rectangular shape, requiring somewhat unorthodox adaptive connections to conventional round ducts.

During manufacturing of conventional round ducts, a problem has been encountered with wrapping of semi-rigid materials, such as a thin aluminum sheet, about a rotating mandrel. While the semi-rigid materials provide flexibility to the resulting duct produced in this fashion, the manufacturing process is complicated due to the fact that semi-rigid materials may tear under the tension applied during the wrapping procedure. The solution to this problem, until now, has been to avoid the use of thin aluminum sheets in constructing semi-rigid ducts, and to rely on heavier, more rigid materials, which do not lend themselves to flexibility, and are unwieldy to install, as mentioned above in relation to U.S. Pat. No. 5,281,187 to Whitney.

A "SEMI-RIGID DUCT" product number A045/9 5-FT, manufactured by "Deflecto Corporation", is known, manufactured without the use of wire or glue, and has the disadvantage of not being rigid enough, so if it gets crushed, it will obstruct the airflow and there will be a lint buildup which is a fire hazard.

In our previous application, U.S. patent application Ser. No. 12/692,612, filed by the present inventors, a method and double-layered duct product is shown having only two layers of aluminum, which overcome the above-mentioned disadvantages. Even with this improvement, heavy boxes or bottles such as detergents and fabric softeners often fall off the dryer and land on the duct, crushing it as a result.

Therefore, it would be desirable to manufacture a duct that is more rigid and durable, which will withstand heavy impact forces, which might crush the duct and reduce its diameter.

SUMMARY OF THE INVENTION

The present invention seeks to provide a durable semi-rigid, multi-purpose flexible duct that is fire resistant and that is lighter in weight and less expensive than those used in the prior art, while maintaining rigidity and structural integrity, even after having been compressed to a compacted configuration for shipping and storage and then re-extended for installation.

Further, the duct has minimal internal topographical features or structure, even when re-extended after having been compressed to a compacted configuration for shipping and storage.

The present inventive duct is even more rigid than the previous ducts invented by the same inventor, and maintains its structure and is not affected by heavy impact forces. The duct of the present invention has a more structured appearance and is lighter and more aesthetic than the previous double-layered duct.

A further aim of the present invention is to provide a semi-rigid, multi-purpose flexible duct having a cross-sectional configuration which may be round, square or rectangular according to need, and which may be used for such diverse uses as gas transport, for example in air conditioning systems or as a gas dryer duct; and the enclosure of utility pipes and cables in an isolated and low-fire-hazard environment.

The present invention further seeks to provide a method for manufacturing such a duct that is simple, fast, cost-effective and efficient.

In a preferred embodiment there is provided a duct, which includes a single-layer of aluminum with sufficient thickness, wrapped around a resilient helical element to provide flexibility and withstand the tension developed during the wrapping procedure about a rotating mandrel, wherein the helical element imparts helical corrugations to the aluminum layer, said layer is being formed with a plurality of closely and evenly-spaced ridges embossed in between a pair of said corrugations, such that the duct is axially extendible between a compacted configuration suitable for storage and for shipping and an extended configuration, wherein said compacted configuration is in a ratio between 1:2.5 and 1:5 to said extended configuration; and wherein the aluminum layer is of a predetermined thickness rendering the duct substantially rigid when in the extended configuration, and enabling the duct to maintain its substantial rigidity upon extension from the compacted configuration, and wherein said closely and evenly-spaced ridges impart additional rigidity to said duct, causing said duct to be resilient and withstand heavy impact forces, which might crush the duct and reduce its diameter.

There is thus provided, a semi-rigid, flexible duct, which, in accordance with the present invention, may be used for gas transport, such as in cooling or heating systems or for machine exhausts, including but not limited to clothes dryers. It may further be used for enclosing utility lines, such as water, gas, electricity, and telecommunications, particularly when the duct is employed in its rectangular configuration. The duct of the present invention, when formed so as to have a rectangular cross-section, may easily be disposed between two leaves of a hollow wall construction, beneath a suspended wooden or other floor, and within a suspended ceiling, so as to provide an efficient, lightweight yet secure, and easily installable manner of passing utility lines behind, beneath or below building elements.

An advantage of the above-mentioned embodiment of the present invention is that due to its rigidity and structural integrity, there is a reduction in the tendency of the duct to accumulate lint, thereby reducing fire hazards.

A further advantage of the above-mentioned embodiment of the invention is that unlike the prior art flexible ducts, such as mentioned in U.S. Pat. No. 5,526,849 (see Background), the elimination of a plastic layer from the duct construction further reduces fire hazards.

In the preferred embodiment, the thickness of the single-aluminum layer is in the range of 80-100 microns, which is thicker than the layer of the aluminum of the previous double-layered duct. This thickness-range is not known to be used for multi-layered ducts.

In the preferred embodiment, the duct contains closely and evenly-spaced ridges additional to the ridges already formed by the spiral internal wire. The fine ridges add strength to the duct, and resilience, so that when it is compressed and then extended, there is no loss of the inner diameter, unlike in the previous inventive duct.

The inventive duct is designed to be connectable to various types of equipment, by use of a specially-designed threadable connector ring.

Because the ridges are multiple and in close proximity to one another, they serve as threads that provide a screw connection. This enables a threaded connecting ring to be screwed onto the duct, having matching threads, on one side thereon, and on the other to be connected to the dryer via a snap-on adaptor. Until now, a dryer duct would be connected to a dryer by using adhesive tape or the like, which does not provide a reliable connection. Also, the screwed-on connector provides easy maintenance of the duct, since it eases the operation of disconnecting and re-connecting it to the dryer.

The connector ring can also be utilized for the exhaust on the other end of the duct, connecting it to the wall. The connector ring can then be connected to one part of a "draft blocker" that is connected to an opening in the wall, and the second part of the "draft blocker" is connected to the other side of the opening in the wall. The second part has a flap that opens only when air is blowing through the wall, and not when it is blowing in the other direction. Therefore, air from the outside cannot penetrate into the duct.

Another use for the connector ring is connecting it to a "lint trap", which is used when there is no access for the duct to the outside. The "lint trap" provides housing for the lint that is released from the duct, so as not to allow the lint to scatter around the vicinity of the dryer. The "lint trap" can be hung on the wall, or placed on the floor.

In a preferred method of manufacturing a durable semi-rigid flexible duct, the method comprises the steps of:

a) providing a mandrel of preselected diameter for fabricating a duct therearound, said mandrel having a plurality of individual rollers, at least one of which has circumferential grooves formed on the distal end thereof; b) providing a continuous aluminum ribbon of predetermined thickness, having inner and outer sides; c) wrapping said continuous ribbon with a predetermined overlap around said mandrel to form a sleeve, wherein said sleeve is formed by the overlap of said ribbon upon itself, such that the inner most side of said ribbon overlaps with the outer most side of a previous wrapping; and d) applying glue to said continuous ribbon for the bonding of said overlap, wherein said glue is cured by a drying drum; e) winding a resilient wound element disposed at the mid point of said overlap of said aluminum ribbon, thereby to form a duct; f) forming ridges on said aluminum ribbon by causing engagement of multiple ridged breakdown wheels with a modified roller, while said aluminum ribbon is in between them, wherein said ridged break-down wheel is supported by a mounting arm external to said mandrel.

When a predetermined length of the duct is in the extended configuration and is disposed horizontally and supported at a first end thereof, the duct is fabricated to bend under the influence of gravitational force such that a second unsupported end thereof is lower than the first supported end by no more than a predetermined percentage of the predetermined length. Further, when a predetermined length of the duct is in the extended configuration and is disposed horizontally and supported at both ends thereof, the duct is fabricated to bend under the influence of gravitational force such that the central portion thereof is also lower than the level of the supported ends by no more than a predetermined percentage of the predetermined length, which, for a 2 meter length of a duct with a diameter of approximately 10 centimeters, will be up to 3 millimeters for an extended duct that was not compacted and also for a duct that was extended from the compacted configuration.

Additionally, the resilient helical element is fabricated of a metal having spring-like resilience, such as a wound galvanized wire of a diameter in the range 0.9 to 1.3 millimeters.

Further, in accordance with a preferred embodiment of the invention, the resilient helical element is aligned with the inner wound wrapping so that the wound galvanized wire is approximately centered at the overlap of the aluminum ribbon.

The duct may serve as a gas transport duct or as a duct for enclosing utility supply lines, and has a cross-sectional configuration which may be circular or polygonal, such as square or rectangular.

In accordance with a preferred embodiment of the present invention, the method further includes in step f) of winding, the additional step of imparting to at least a portion of the duct, a polygonal cross-sectional configuration, such as square or rectangular.

Thus, the present invention advantageously provides a single-layer semi-rigid, multi-purpose flexible duct that is resilient, fire resistant and that is lighter in weight, is less expensive and faster to manufacture than those used in the prior art.

Further advantages of the invention will become apparent from the following drawings and description.

BRIEF DESCRIPTION OF THE DRAWINGS

The present invention will be more fully understood and appreciated from the following detailed description, taken in conjunction with the drawings, in which:

FIG. 20b is a perspective view of a draft blocker when the dryer is turned on;

FIG. 24a is a schematic diagram of apparatus for imparting a selected polygonal cross-sectional configuration to a circular duct;

FIG. 24b is an enlarged schematic representation of the apparatus of FIG. 21a; and FIG. 24c is an end view of the apparatus illustrated in FIG. 21b.

FIG. 25a is a perspective view of a square duct having a round two-piece connector on both its ends;

FIG. 25b is a side view of the duct of FIG. 22a; and

DETAILED DESCRIPTION OF THE INVENTION

Figure 1:
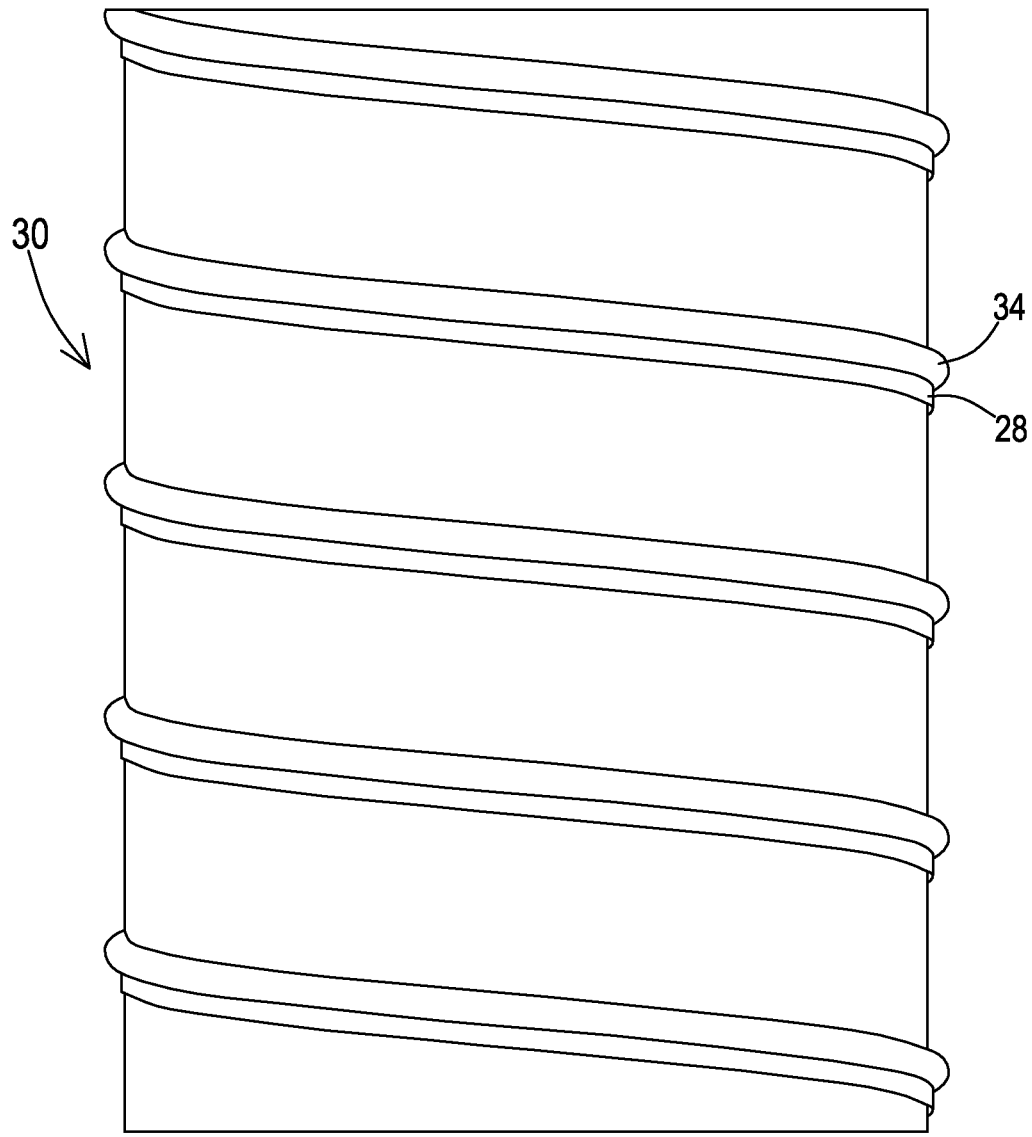
FIG. 1 is a top view of a section of the inventive single-layered duct.

Referring now to the drawings, there is shown in FIG. 1 a top view of duct 30, constructed in accordance with the principles of the present invention. Duct 30 has corrugations 34, and at least two additional closely and evenly-spaced circumferential ridges 28 between two corrugations 34, for adding strength and resilience to the duct 30.

Figure 2:
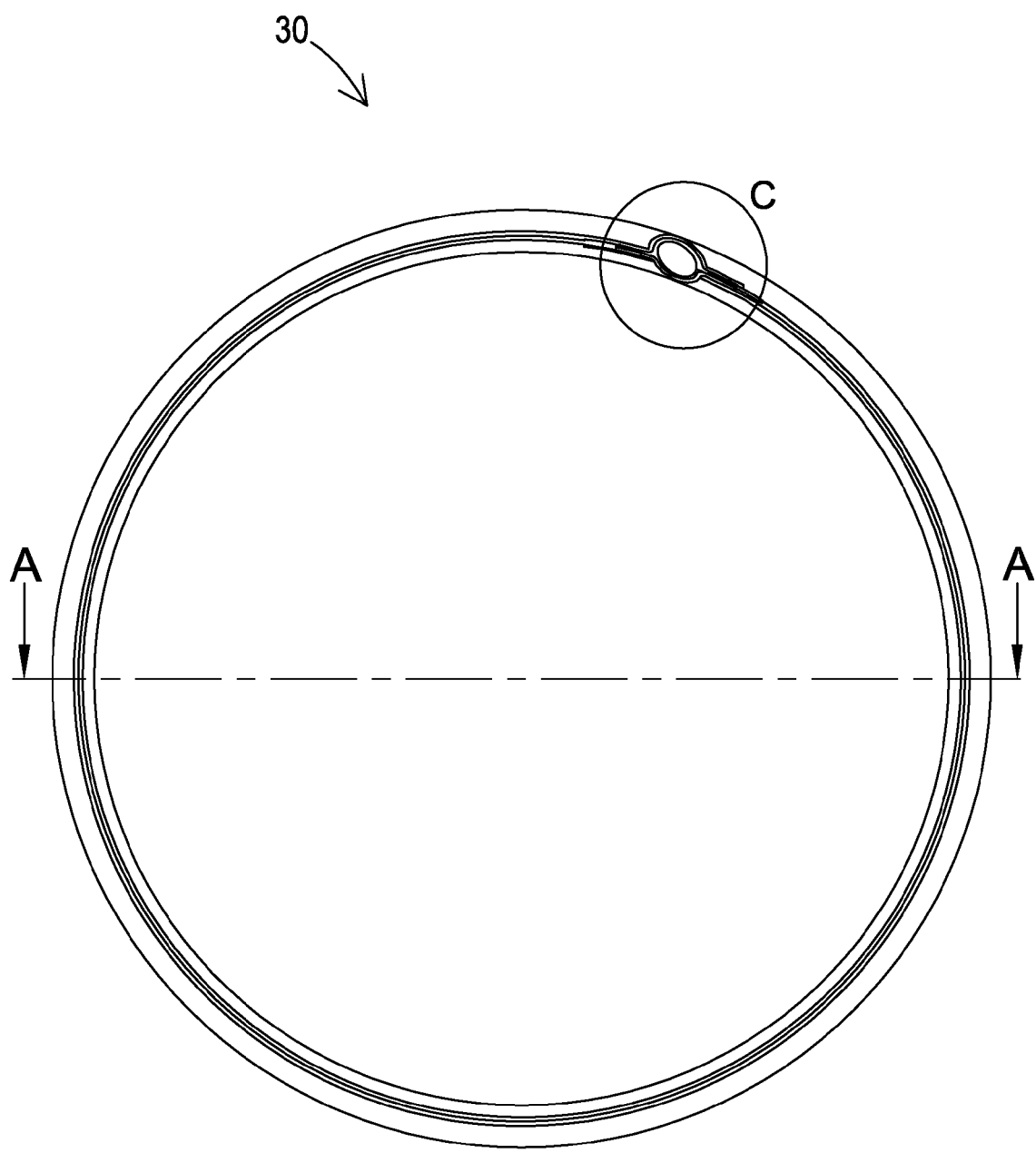
FIG. 2 shows an end view of the duct of FIG. 1.

Referring now to FIG. 2 there is shown an end view of the duct 30.

In accordance with the present invention, the specific description below of cylindrical duct 30 applies equally to non-cylindrical ducts, such as square duct 100 (FIGS. 24a-24b) as well as variations thereof, all as described hereinbelow.

By way of clarification, the term "helical," and variations thereof, derives from the description of the manufacture of the ducts of the invention, and relates to the act of winding various elements in a spiral or helix. In the embodiments of the invention in which the duct remains cylindrical, the helical windings clearly remain helical. In those polygonal embodiments of the invention however, the windings, while not being strictly helical, retain a general square-helical arrangement, and may be referred to as such, although mainly they are referred to merely as "windings" or "wound."

Figure 3:
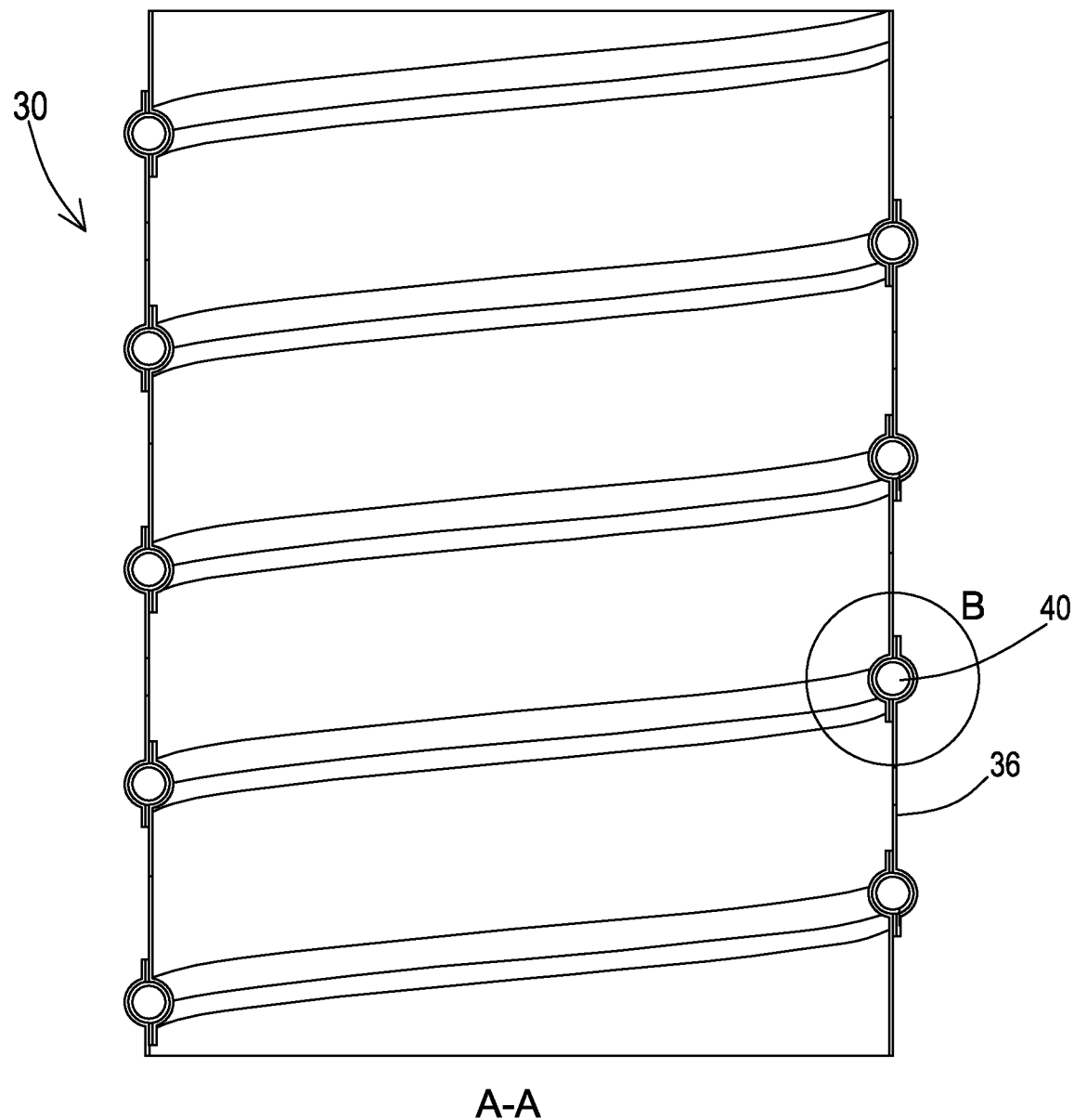
FIG. 3 shows a top view of a longitudinal cross section of the duct of FIG. 2 taken along section lines A-A.

Referring now to FIG. 3, there is shown a top view of a longitudinal cross section of the duct of FIG. 2 taken along section lines A-A.

Figure 4:
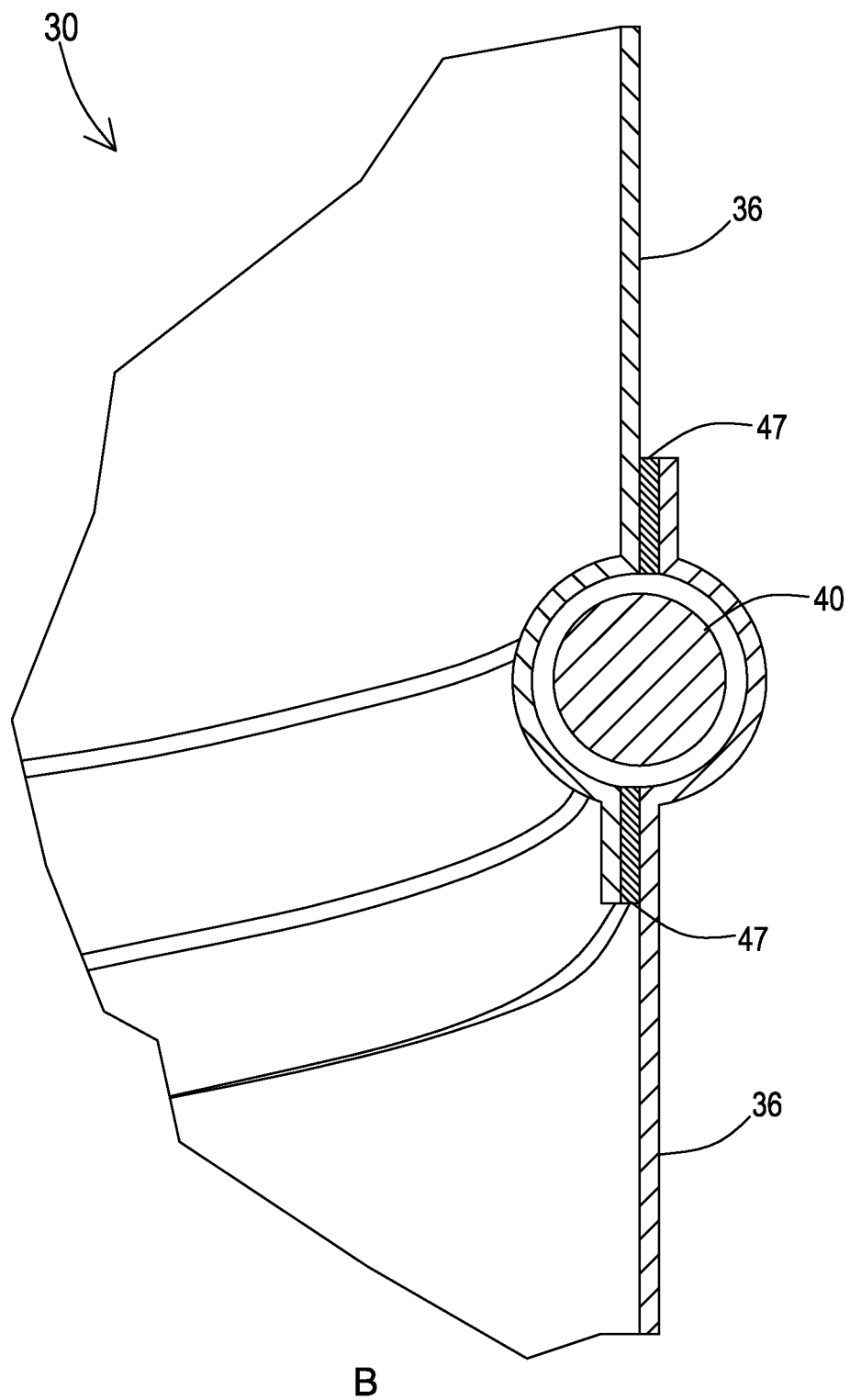
FIG. 4 shows an enlarged view of area B of FIG. 3.

Referring now to FIG. 4, area B (FIG. 3) is shown, illustrating the overlap of the aluminum ribbon 36 upon itself, bonded to each other by glue 47, and the wound helical wire 40, preferably galvanized wire, encapsulated between the overlapping layers of the single-aluminum ribbon.

Figure 5:
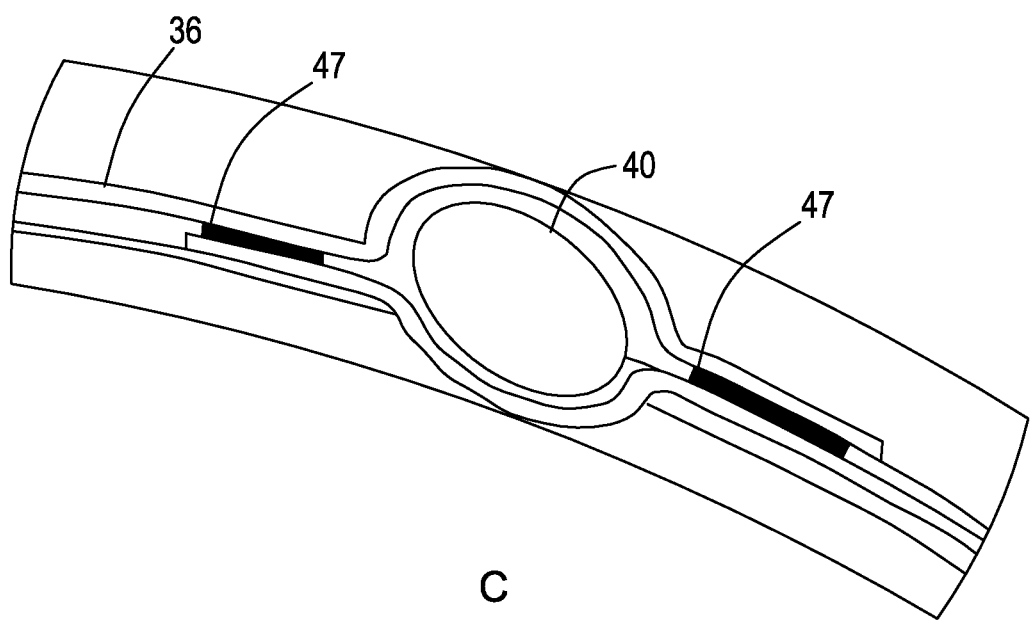
FIG. 5 shows an enlargement of area C of FIG. 2.
Figure 6:
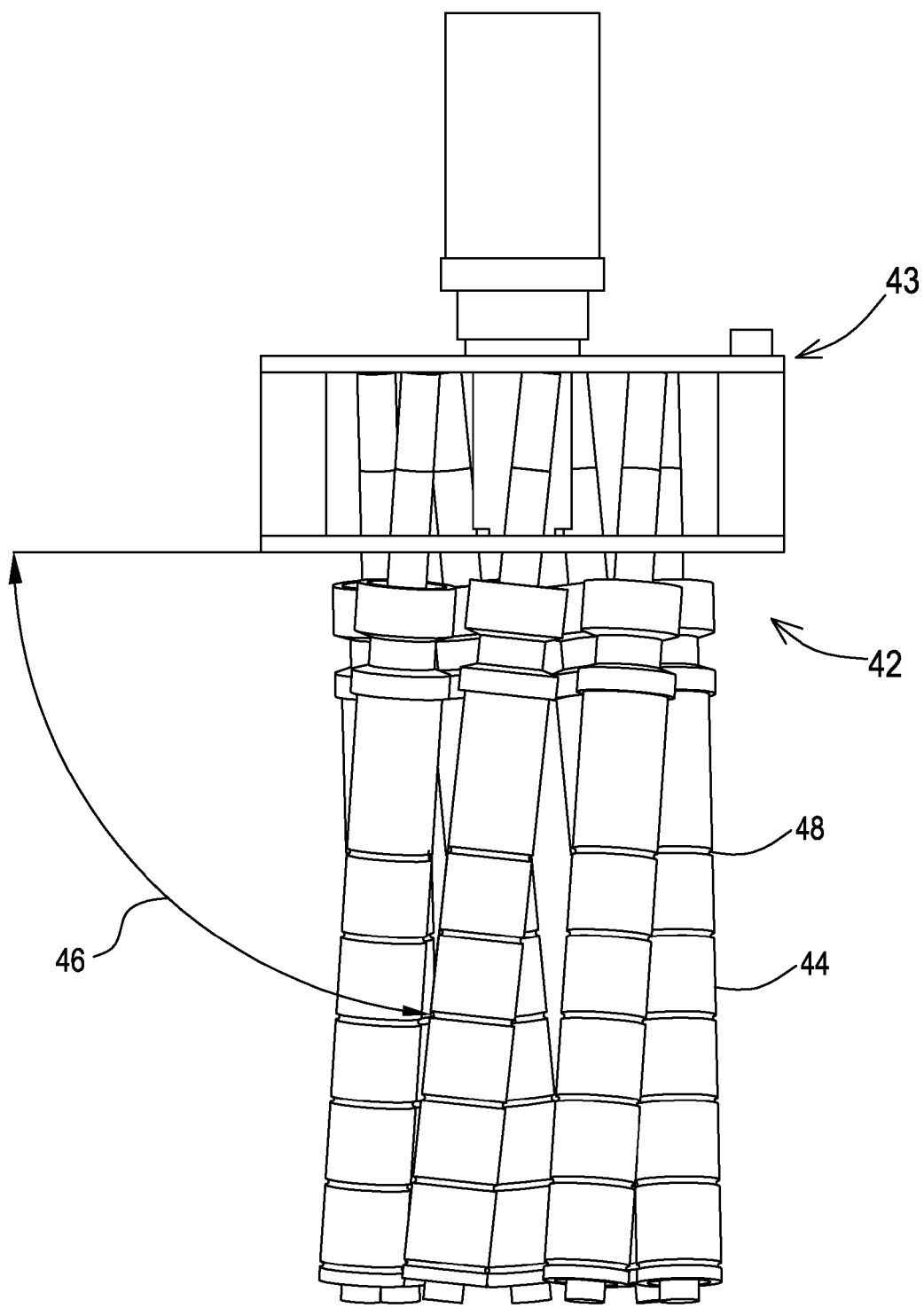
FIG. 6 shows a top view of a mandrel construction used in manufacturing the duct of FIG. 1.

Referring now to FIG. 5, area C of FIG. 2 is shown, illustrating a cross section of the inventive duct;

Referring now to FIG. 6, the construction of mandrel 42 is shown, comprising a plurality of rollers 44. Rollers 44 are all individually rotatable, and each is mounted on a fixed plate 43 at an angle 46 with respect to the plate 43. Each individual roller 44 has formed therein a set of grooves 48 for accepting the wire 40 which forms the basis for the spiral format of the flexible duct 30. These grooves 48 are precision-shaped and are precision-spaced apart in order to accept the predetermined flow of wire 40, and this flow is established by the angle 46 of the roller. Typically the angle 46 is adjusted to establish the correct flow of both wire and ribbon. The wire 40 (FIG. 7) is fed from a spool onto the mandrel 42, and the mandrel 42 is designed such that each individual roller 44 is mounted thereon at a particular angle 46, to provide a flow effect which enables the tape 36 (FIG. 5) to be fed onto the mandrel 42 and to be taken off in a helical form. Thus, the wire feed becomes a spiral form for the length of the duct 30 being drawn off the mandrel 42 in an automatic fashion.

Figure 7:
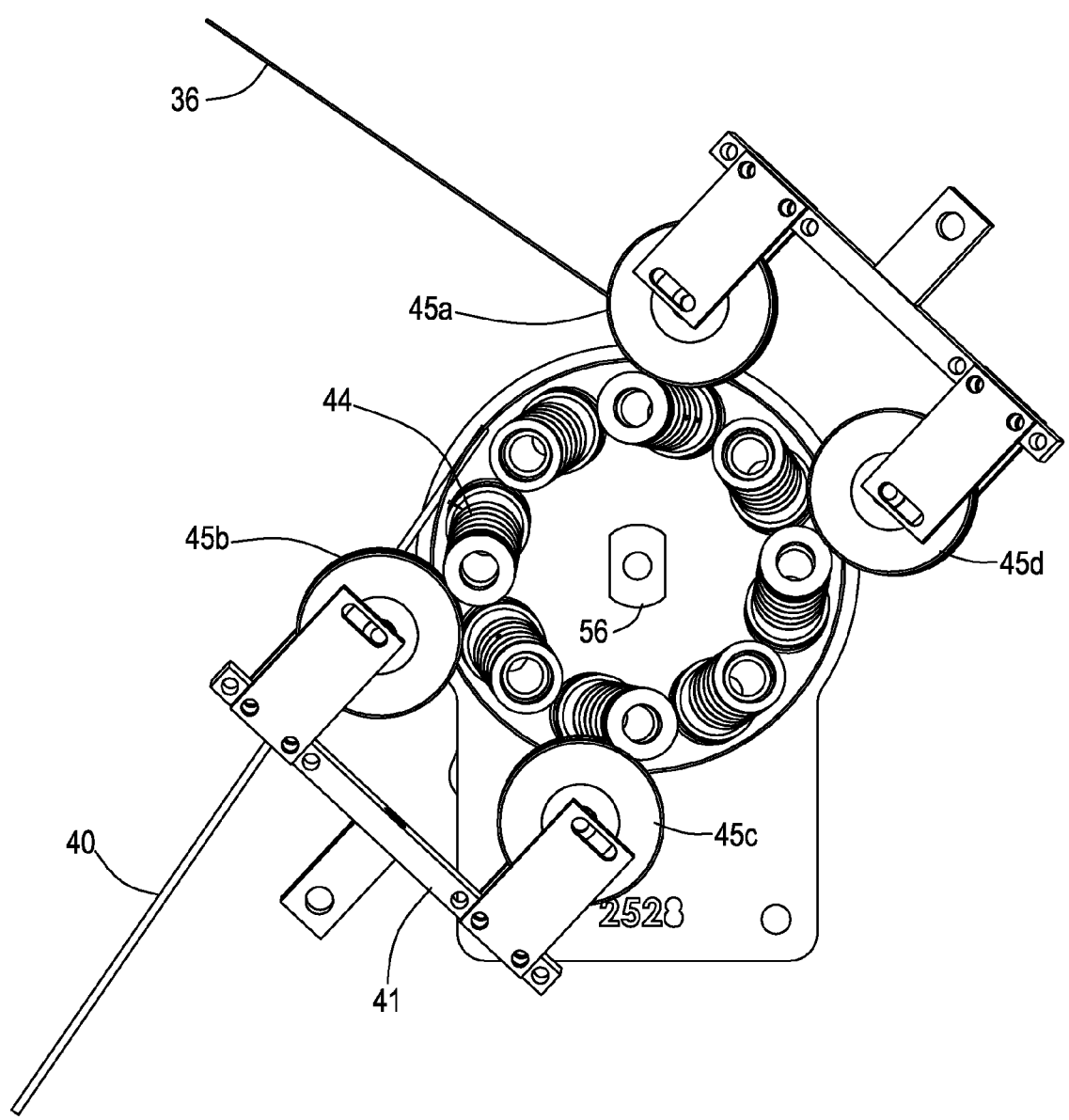
FIG. 7 shows a side view of a mandrel during the manufacturing process of the duct of FIG. 1.
Figure 9:
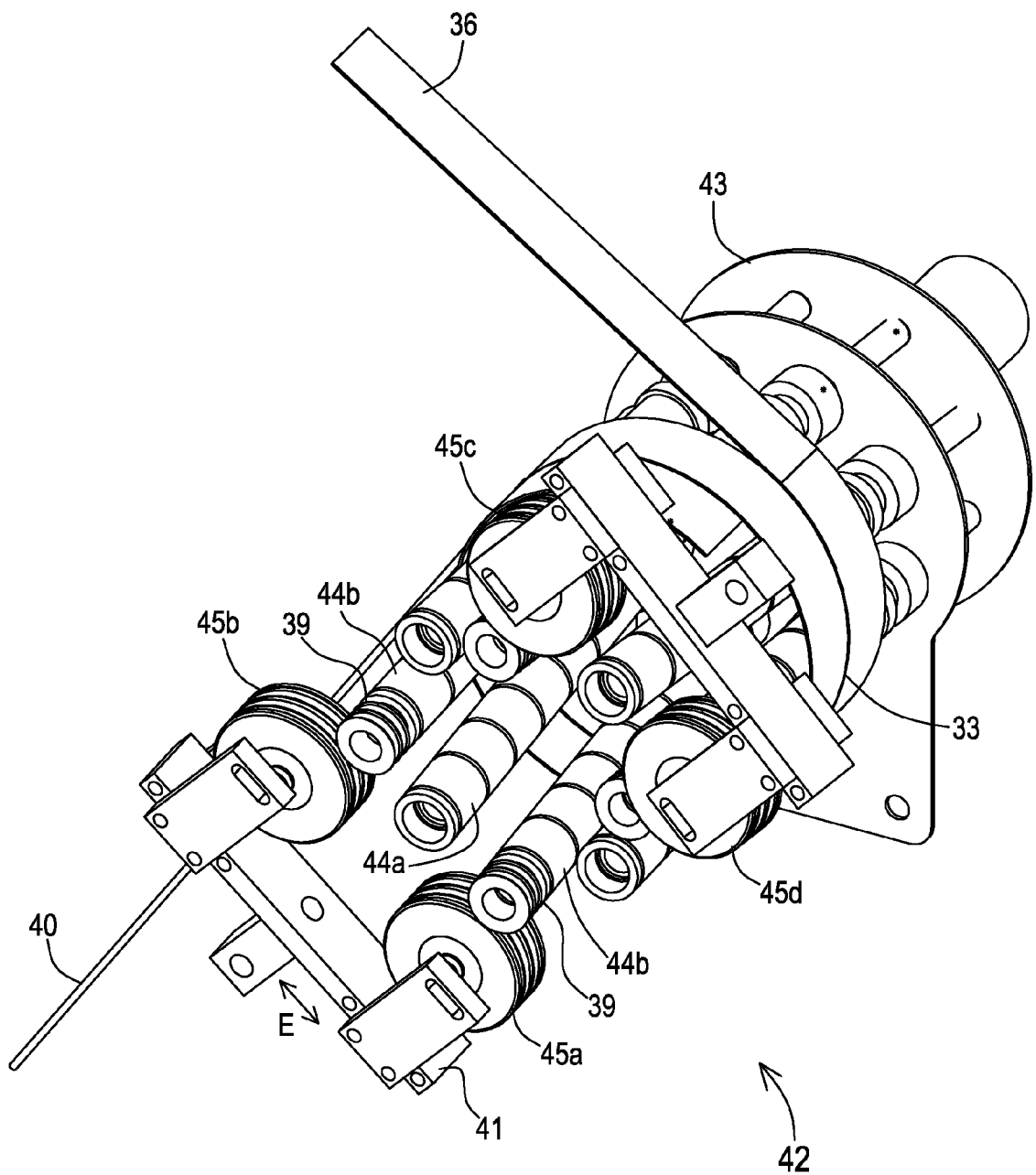
FIG. 9 shows a perspective view of a mandrel assembly in the process of manufacturing the inventive duct.

Referring now to FIGS. 7 and 9, there are shown, respectively, a side view and perspective view of mandrel 42 in the midst of the process of fabricating a duct 30. The overall diameter of the duct 30 being fabricated is determined by mandrel 42 which is rotated about its longitudinal axis 56. Aluminum tape 36 is helically wound with a predetermined overlap 33 around mandrel 42 as it turns to produce the single-layer sleeve (not shown) of duct 30 as a first step in forming duct 30. Galvanized wire 40 is helically wound around the single-layer sleeve of duct 30 as mandrel 42 turns with the single-layer sleeve formed thereupon. Tape 36 is helically wound with a predetermined overlap 33 upon itself with galvanized wire 40 wound thereabout and disposed at the mid point of the overlap region as mandrel 42 turns with the tape 36 and the wire 40 wound thereupon to produce the single-layer duct 30.

For the purpose of creating multiple, closely and evenly-spaced ridges 28, four of the rollers 44a of mandrel 42 are modified by adding circumferential grooves 39 to the distal end of the rollers, to create modified rollers 44b. A mounting arm 41, external to the mandrel 42, holds four ridged breakdown wheels 45a-45d, having projecting ridges thereof, which mesh with the circumferential grooves 39 of rollers 44b by engagement. The design of break-down wheels 45a-45d is such that the projecting ridges thereof form multiple closely and evenly-spaced ridges 28 at a pre-determined ridge-depth, between a pair of corrugations 34, on the aluminum tape 36. During the setup process the wheels 45a-d are adjustably moved into position (arrow E) so that their ridges engage the grooves 39 formed at the distal end of modified rollers 44b. Once this position is established it is maintained during production. The aluminum tape 36 passes in between rollers 44b and wheels 45a-d, as it advances along the rollers of the mandrel 42, thus the grooves and ridges of rollers 44b and wheels 45a-d, respectively, are embossed on aluminum tape 36, so as to form the closely and evenly-spaced ridges 28 of the duct 30.

Figure 8:
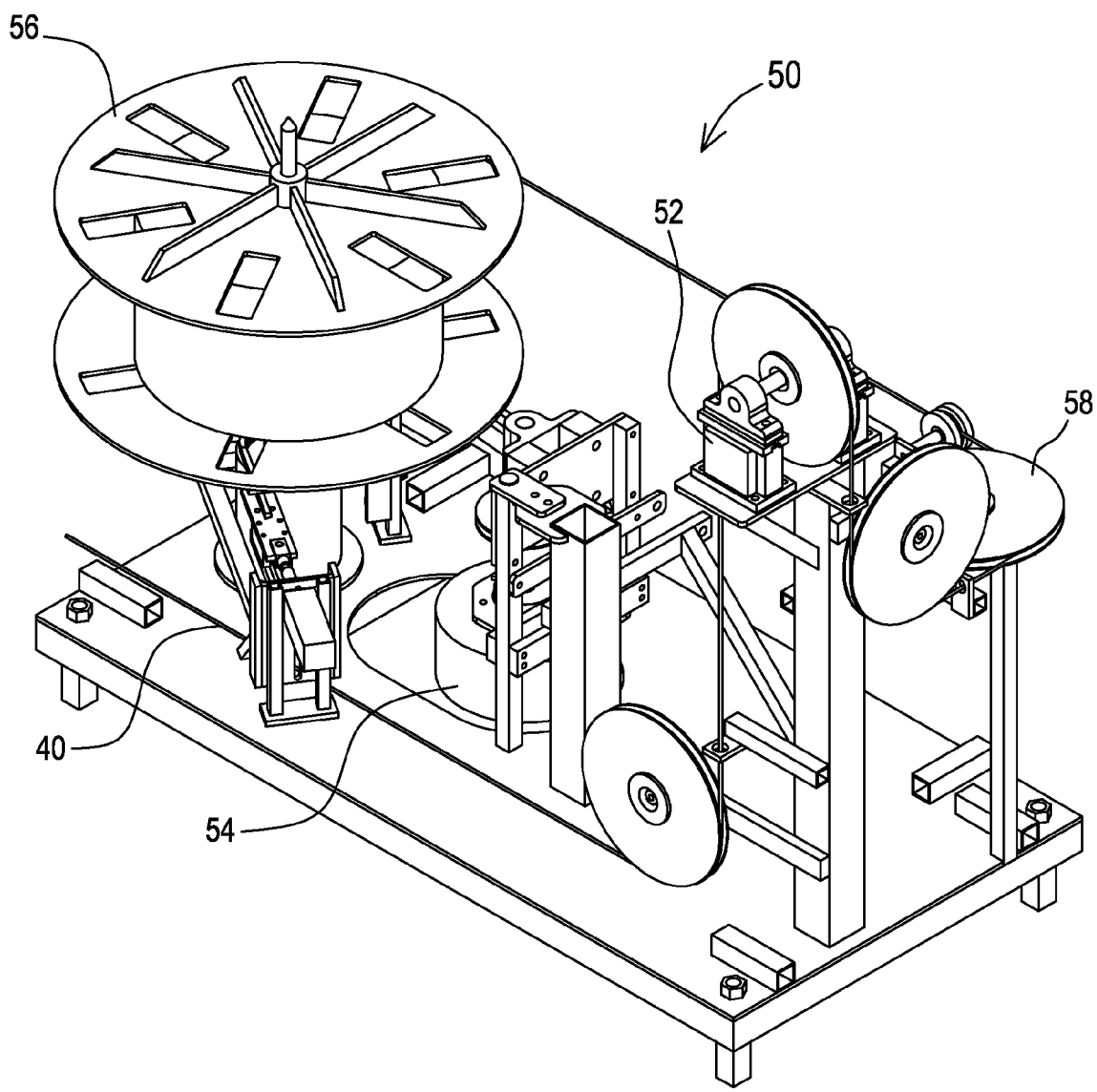
FIG. 8 shows a wire-feed system for tension control of the wire fed to the mandrel.

Referring now to FIG. 8, a wire-feed system 50 for tension control of the wire 40 fed to the mandrel 42 is shown. The tensioning of the wire 40 is provided by equipment placed on the automatic wire-feed system 50 which incorporates a load cell 52 that controls an electronic brake 54 which controls the flow of wire 40 onto the mandrel 42, supplied by the wire feed supply spool 56. The equipment for tensioning also includes a plurality of tension pulleys 58.

Figure 10:
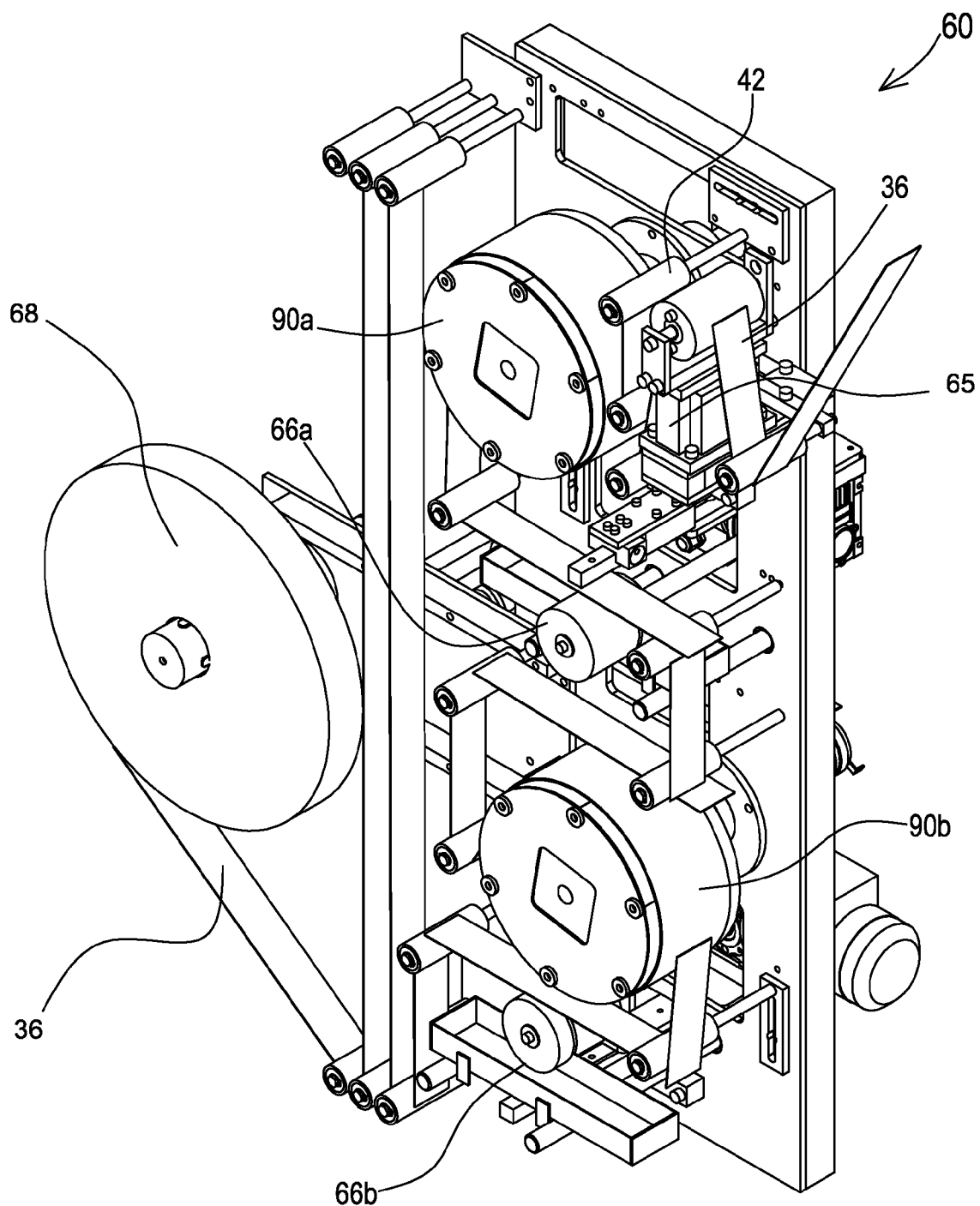
FIG. 10 shows an aluminum tape-feed system for tension control of the tape fed to the mandrel.

Referring now to FIG. 10, there is shown an aluminum tape-feed system 60 for tension control of the tape 36 fed to the mandrel 42. A load cell 65- and electronic brake (not shown) are provided to control rotation of spool 68 of aluminum tape 36, thereby providing it with tension. With the correct control of the spool 68 rotation, to provide a constant tape tension, a proper feed and feed rate are achieved for automatically winding the tape 36 onto the mandrel 42 which is rotated at a sufficient speed to provide an automatic flow for efficient production of the flexible duct 30.

The aluminum tape-feed system 60 and the wire feed system 50, are adjusted to ensure that during the mandrel rotation, the wire 40 is positioned so as to fall at the mid-point of the overlap region of tape 36. Top glue applicator 66a and bottom glue applicator 66b are mounted on the system 60 as well for applying glue to the aluminum tape 36 so the mid-point overlap of tape 36 will bond to the wire 40 and to itself, when creating duct 30. Top glue rotating drying drum 90a and bottom glue rotating drying drum 90b are positioned over glue applicators 66a and 66b, respectively, for the purpose of curing the applied glue. Heating drums 90a-b are made of aluminum alloy, and are precision machined so that they are evenly balanced so that there is no vibration when they rotate, and have 220V electrical elements inside with a total wattage of 2400 W. The temperature is controlled by an electric thermostat and its working temperature is 105 degrees.

The tension of the aluminum ribbon 36 must be constant at all times, otherwise the ribbon will tear. Also, the tension of the wire 40 must be constant and equal to the tension of the aluminum ribbon 36. The tension typically required for fabricating a duct 30 ranges between 75 kgf-80 kgf. The rollers 44 of the mandrel 42 are mounted to plate 43, and are designed so as to provide a flexible spring-like action which absorbs any irregularities in the tension settings or any irregularities associated with the tape and wire materials being used.

Duct 30 is manufactured fully extended by a continuous process, further described hereinbelow, and is then cut to a desired length. The corrugations 34 imparted thereto by wound helical wire 40, and the closely and evenly-spaced ridges 28 imparted by the ridged break-down wheels 45a-d, allow duct 30 to be axially compressed into a compact configuration convenient for storage or shipping. When duct 30 is compressed, as shown in FIG. 11, aluminum layer 36 naturally folds between the corrugations 34 created by wound helical wire 40.

A particular advantage of the unique, single-layered construction of the present invention is that duct 30 maintains its rigidity and structural integrity and functions like a totally rigid duct even after having been compressed to its compact configuration and re-extended to its original length.

Figure 11:
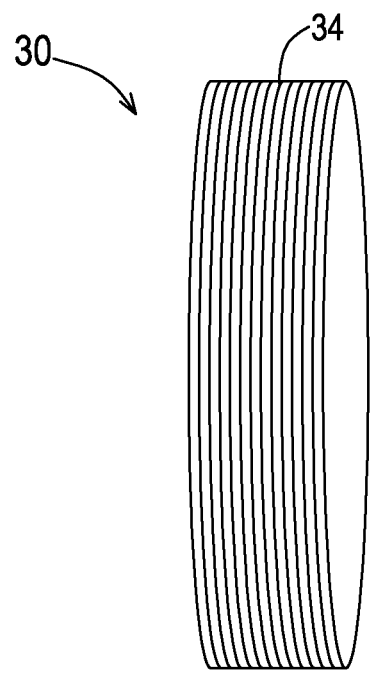
FIG. 11 is a schematic oblique view of a segment of a duct that has been compressed.

Referring now to FIG. 11, there is shown a compressed segment of the duct 30. The ability to compress the duct after it has been manufactured is advantageous for purposes of storing and shipping. Furthermore, the duct 30 retains its shape after compression so once it is extended it returns to its original duct shape, retaining its substantial rigidity.

Figure 12:
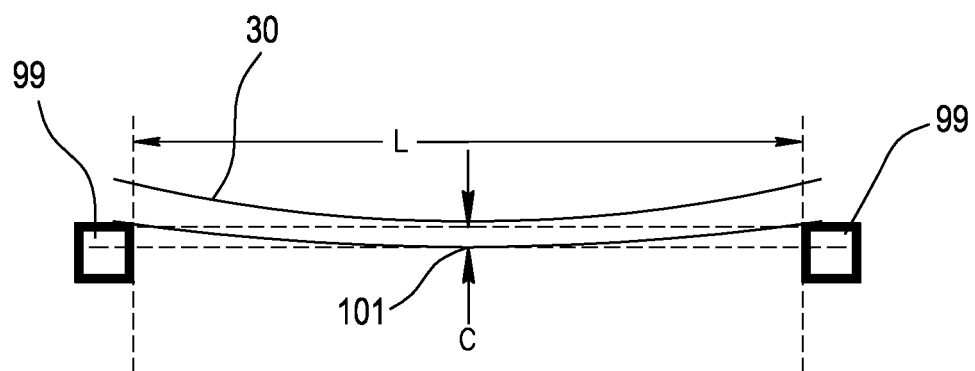
FIG. 12 is a schematic representation of the vertical sag of the unsupported center of a segment of the duct such as that of FIG. 2 supported at its ends.

Referring now to FIG. 12, there is shown, schematically, the vertical sag c of the unsupported center 101 of a horizontal segment of duct 30 spanning between two supports 99 a distance L apart. For example, for a length of duct that has been returned to its extended configuration after having been compressed, a 1.5 meter horizontal span of 10 centimeter diameter duct with no support in its center will substantially maintain its rigid shape and sag (c) in the unsupported center by no more than 1 millimeter, while a similar 2 meter horizontal span of 10 centimeter diameter duct will sag in the unsupported center by no more than 3 millimeters. For a length of duct 30 that has not been compressed, a 1.5 meter horizontal span of 10 centimeter diameter duct that has no support in its center will maintain its rigid shape with negligible sag (c), while a 2 meter horizontal span of 10 centimeter diameter duct will sag in the unsupported center by no more than 3 millimeters.

Figure 13:
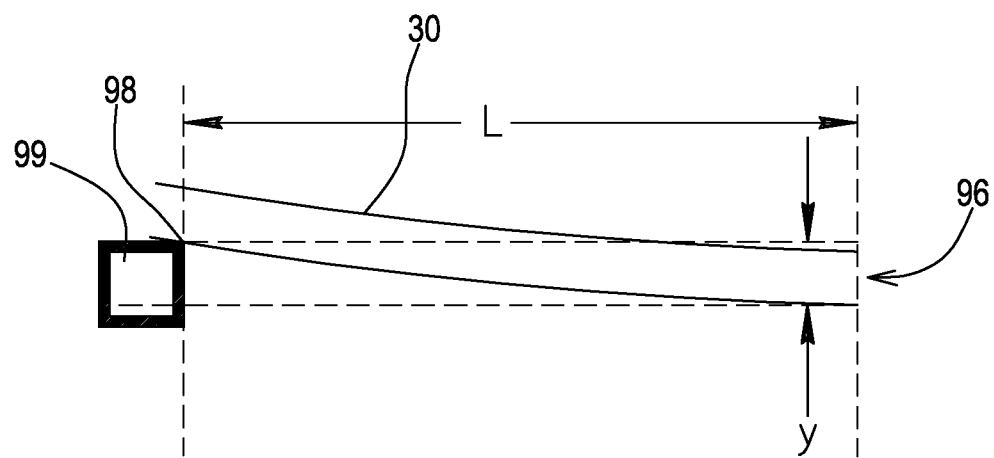
FIG. 13 is a schematic representation of the vertical displacement from the horizontal of the unsupported end of a segment of the duct such as that of FIG. 1 supported at its other end.

Referring now to FIG. 13, there is shown, schematically, the vertical displacement y from the horizontal of one unsupported end 96 of a horizontal segment of duct 30 of length L, as a result of bending due to gravity, when the other end 98 has support 99. Similarly, a vertically deployed segment of the duct of the present invention will maintain its rigidity, and not sag or collapse, even when returned to its extended configuration after having been compressed. As will be clear to those familiar with the art, these features represent a major improvement over the prior art, including solid aluminum corrugated tubes such as those employed in the invention of the Whitney patent (U.S. Pat. No. 5,281,187) discussed hereinabove.

Another advantage of the unique single-layered construction of the present invention is that when it is fully extended after compression, the inward-facing surface of the aluminum ribbon is substantially smooth and featureless except for the helical corrugations imparted by wire winding 40, and the closely and evenly-spaced ridges 28 at the pre-determined ridge-depth imparted by the break-down wheels 45a-d and roller 44b of mandrel 42. This reduces frictional resistance to air flow within the duct, and, for clothes dryer exhaust transition ducts, significantly impedes the accumulation of lint inside the duct, thereby greatly reducing the fire hazard cited hereinabove with respect to the prior art.

Figure 14A:
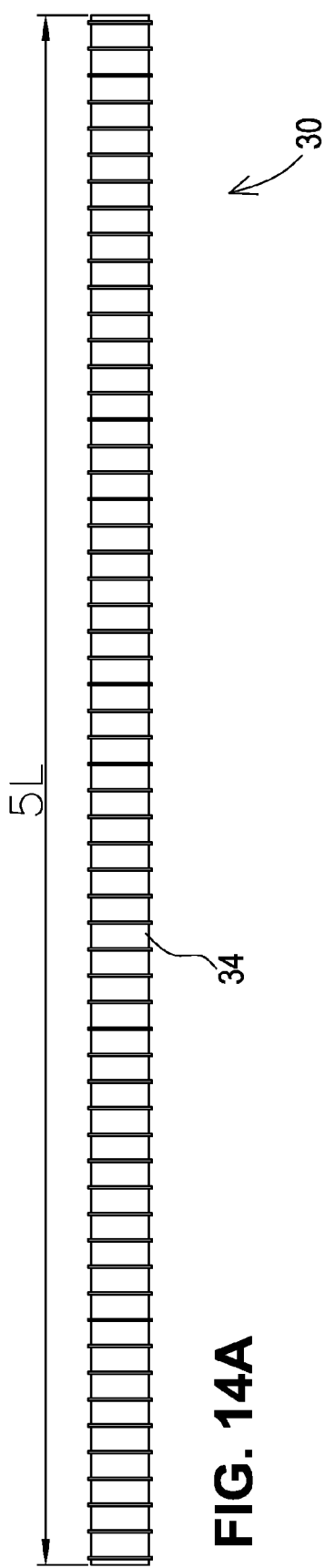
FIGS. 14a-c show the degree to which the extended duct can be compressed into a compacted configuration.
Figure 14B:
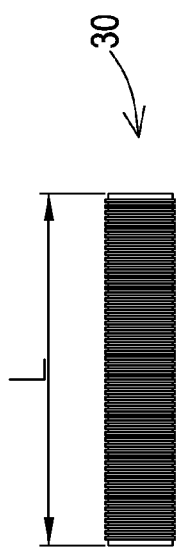
Figure 14C:
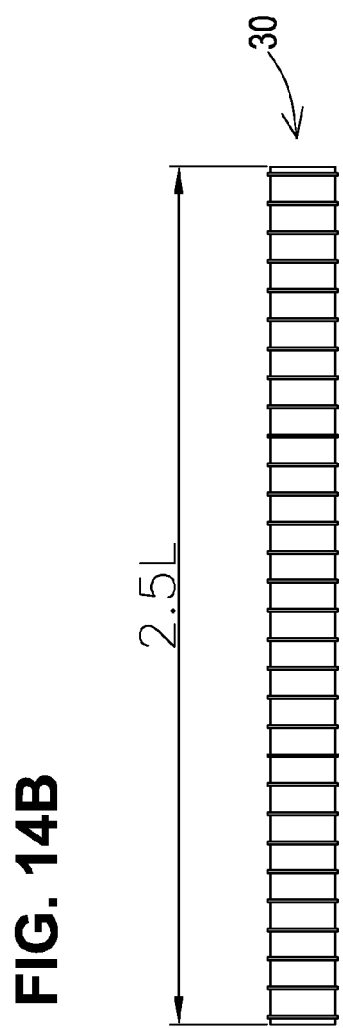

Referring to FIGS. 14a-c, the duct 30 is shown in its extended form, and in its compacted form, illustrating the relative length between them, in a ratio which may vary in a range between 1:2.5 to 1:5.

Figure 15:
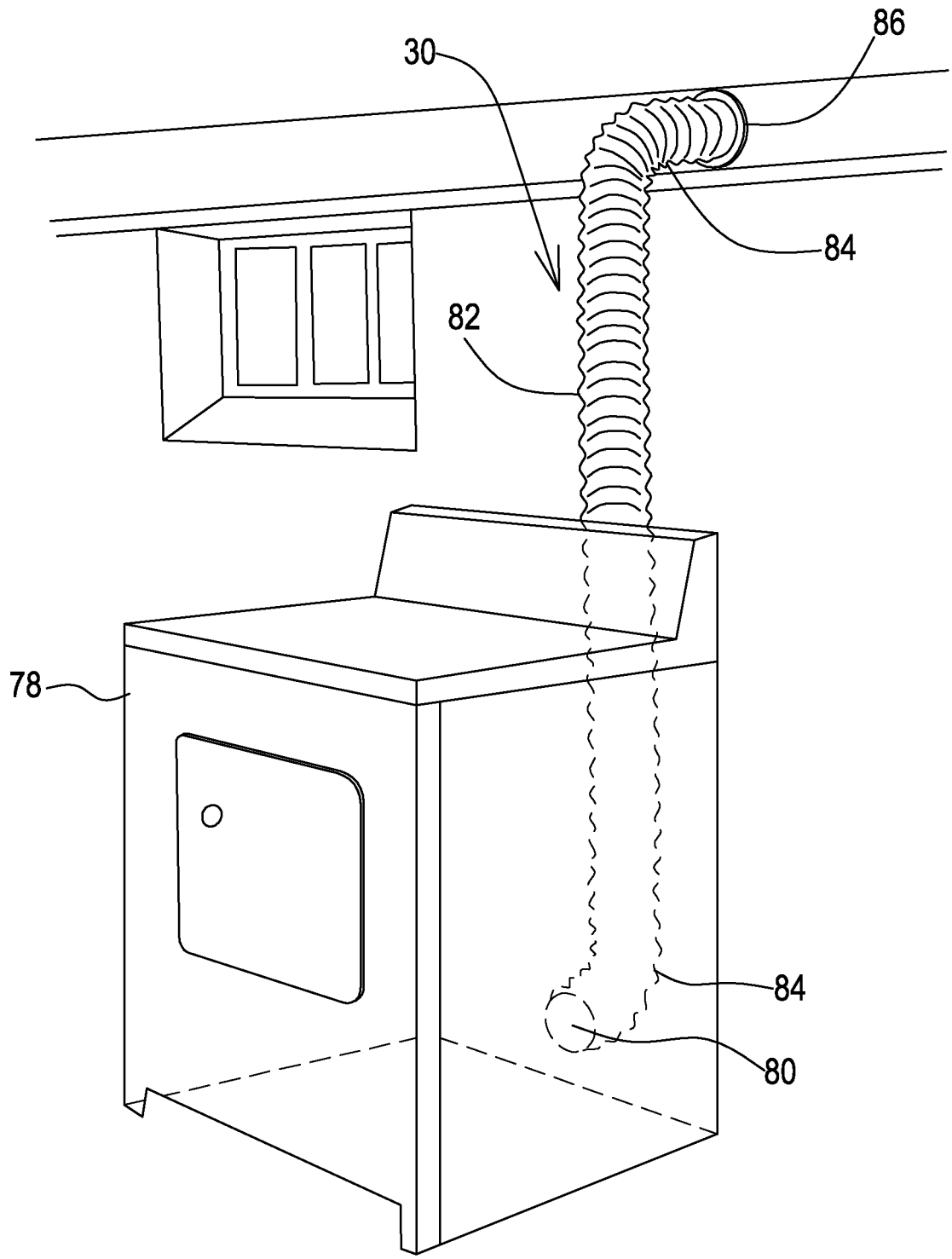
FIG. 15 is a schematic view of a duct, constructed and operative in accordance with an embodiment of the present invention, which is installed as an exhaust transition duct of a clothes dryer.

Referring now to FIG. 15, there is shown a schematic view of a duct 30, constructed and operative in accordance with an embodiment of the present invention, installed as an exhaust transition duct of a clothes dryer 78. Duct 30 is connected to dryer exhaust port 80 and has a vertical segment 82 and two right angle bends 84 connecting it to an outside exhaust port 86, thereby allowing it to vent the exhaust gases of clothes dryer 78. The features of the present invention discussed hereinabove, notably the rigidity and structural integrity and the reduced tendency to accumulate lint are particularly advantageous in applications such as this.

The advantageous properties of the duct of the present invention result both from its unique construction described hereinabove and from the method of manufacture thereof.

Figures 16A, 16B:
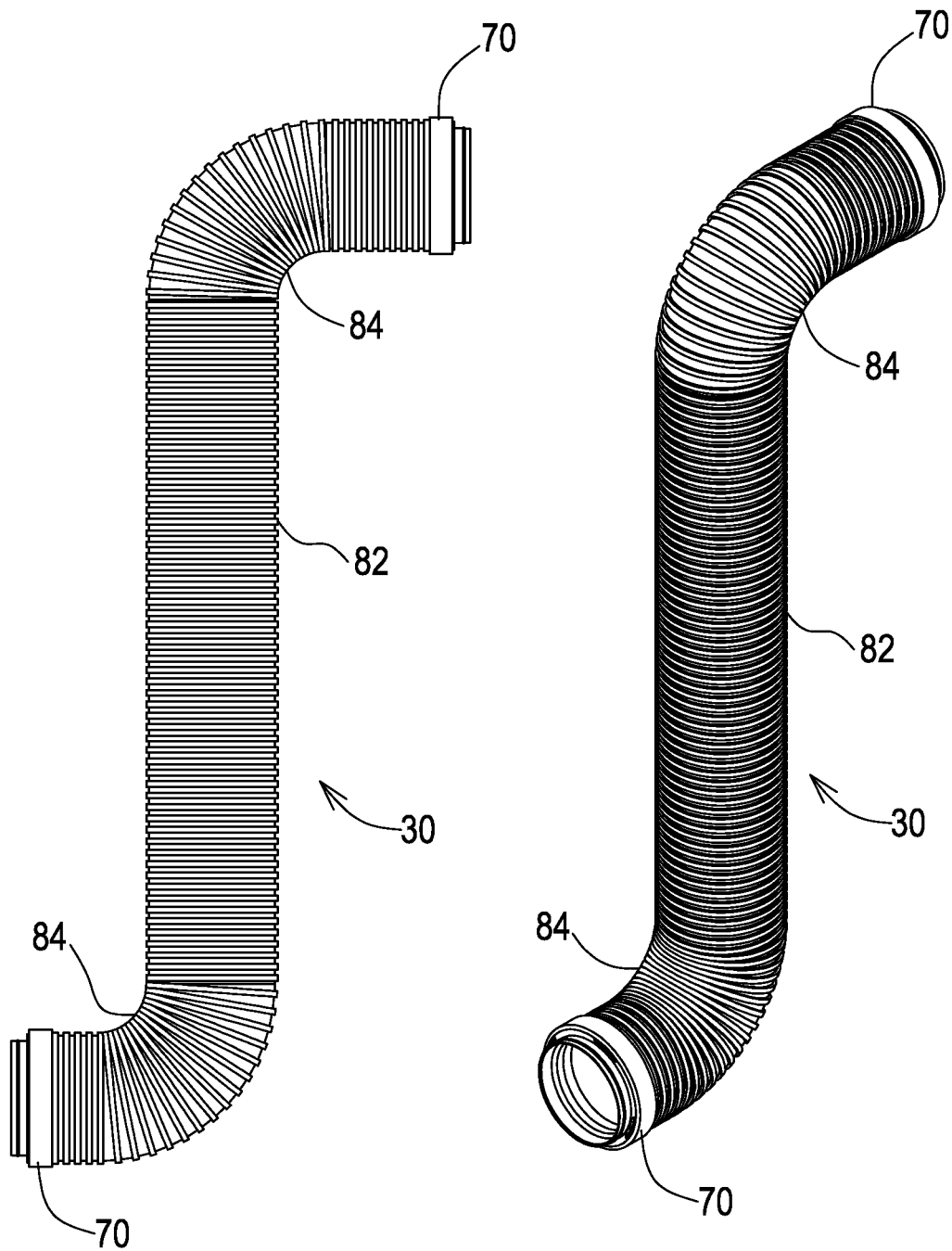
FIGS. 16a-b show a perspective and side view, respectively, of the duct of FIG. 1, with a screwed on adaptor ring on both ends

Referring now to FIGS. 16a-16b, there is shown a duct 30, hanging vertically as shown in FIG. 14, having a duct connector ring 70, on both its ends.

Figure 17A:
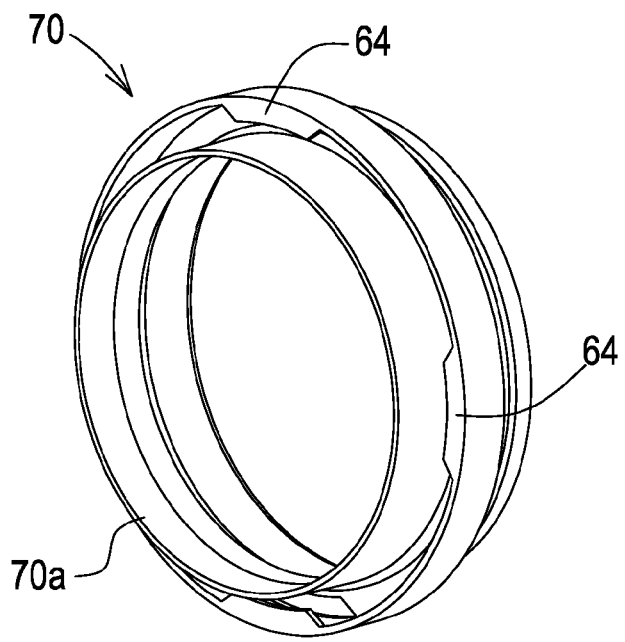
FIG. 17a shows a perspective view of the duct connector ring, showing the side which connects to the duct of FIG. 2.
Figure 17B:
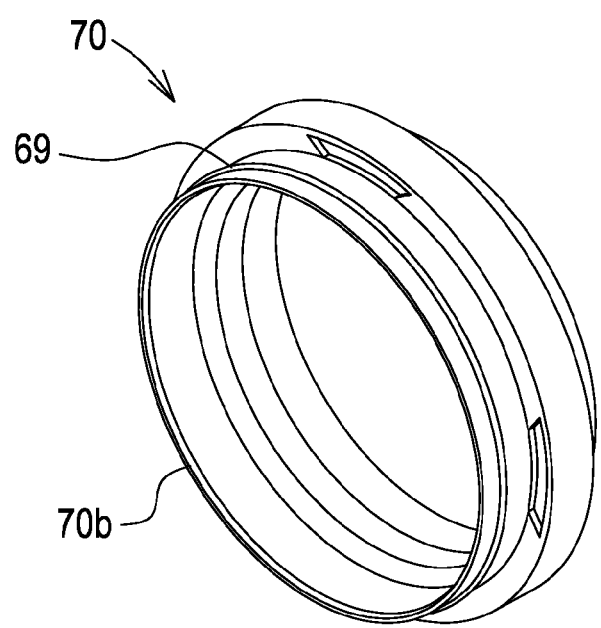
FIG. 17b shows a perspective view of the duct connector ring, showing the side which connects to an adaptor ring.
Figure 17C:
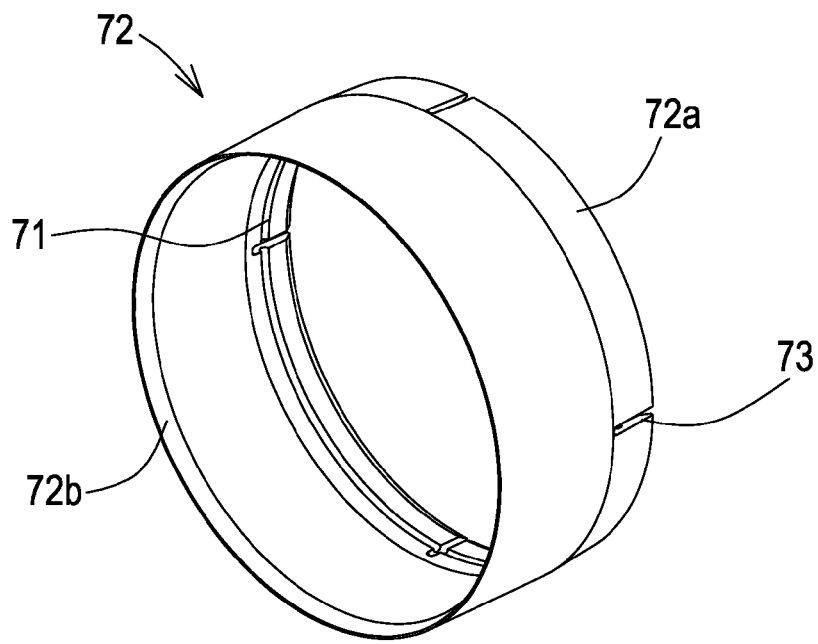
FIG. 17c shows a perspective view of an adaptor ring for connecting to a dryer.

Referring now to FIG. 17a, there is shown the duct connector ring 70 on its side 70a that connects to duct 30. Side 70a of threaded ring 70 is screwed onto duct 30, via tooth-like projections 64, where the duct has matching threads created by the closely and evenly-spaced ridges 28.

Referring now to FIG. 15b, there is shown the duct connector ring 70 on its side 70b that snaps on to an adaptor ring 72 (FIG. 15c);

Referring now to FIG. 15c, there is shown adaptor ring 72, having two sides, side 72a, which connects to connector ring 70, and side 72b, the appliance connection side. Side 72b connects to a dryer or other appliances described hereinbelow. Side 70b of duct connector ring 70 has an annular ridge 69 matching an annular groove 71 of side 72a of adaptor 72, so that when adaptor ring 72 and connector ring 70 are brought together, they connect via a snap-on connection between the annular ridge 69 and annular groove 71. Side 72a of adaptor 72 has a plurality of slits 73 allowing flexibility to side 72a.

Figure 17D:
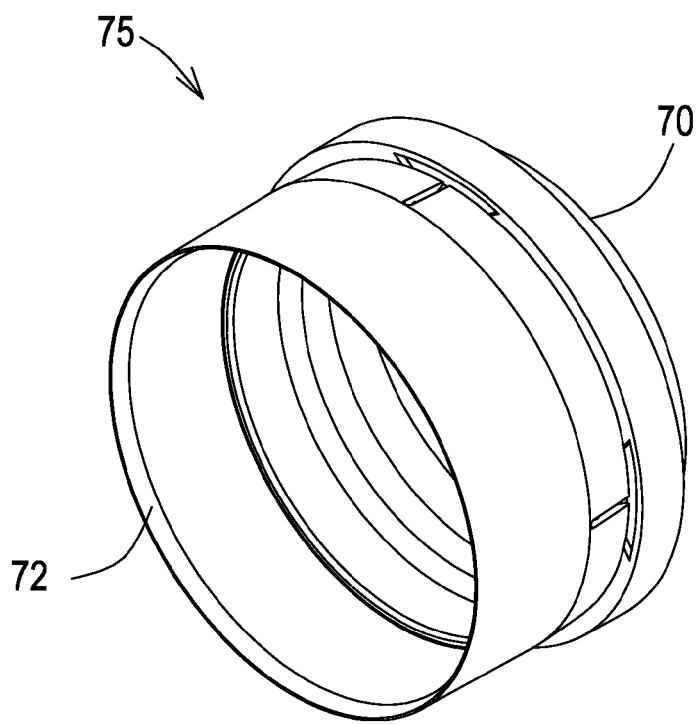
FIG. 17d shows a perspective view of the duct connector ring connected to the adaptor ring for dryer connection.

Referring now to FIG. 17d, there is shown a two-piece connector 75, comprised of duct connector ring 70 and adaptor ring 72, connected to each other.

Figure 18:
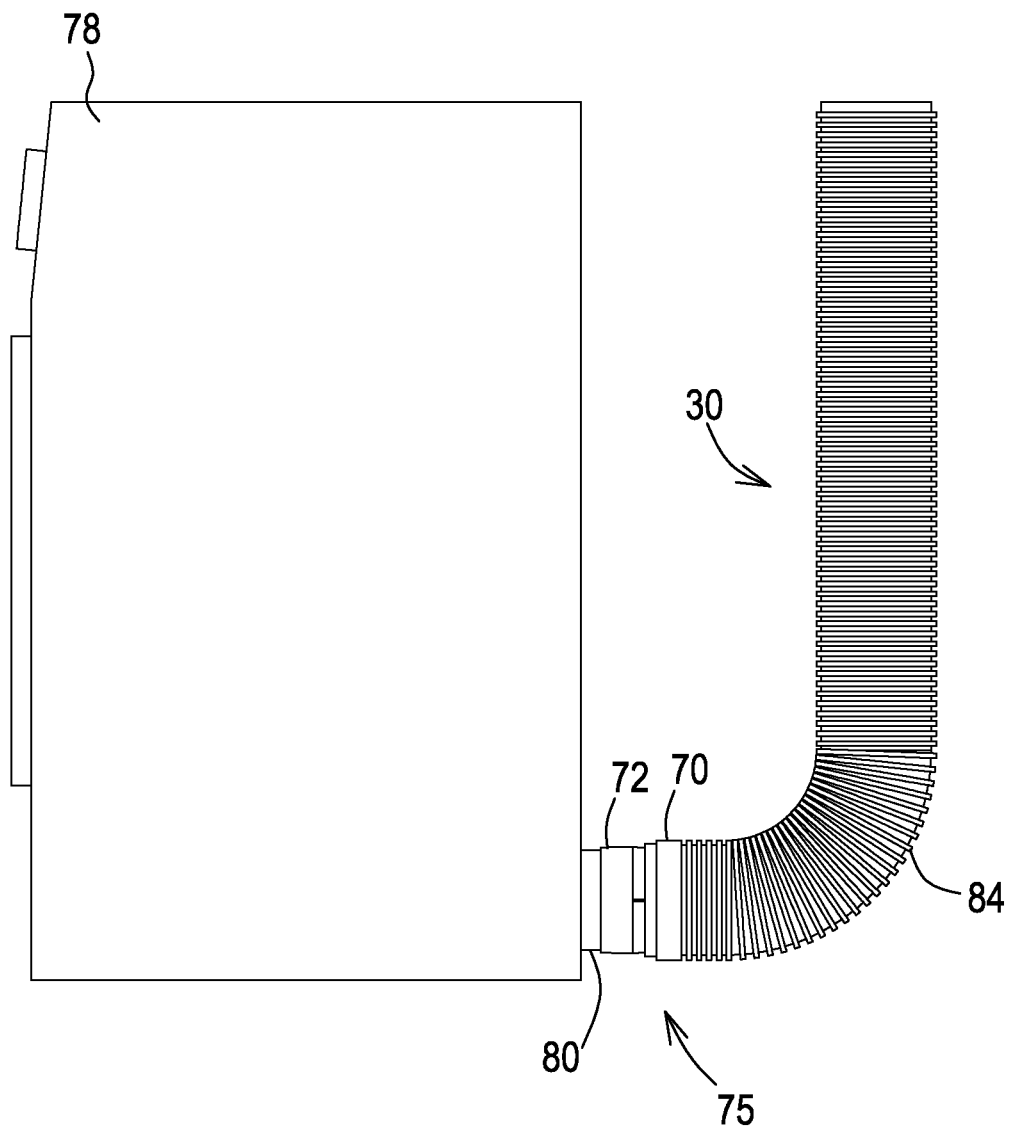
FIG. 18 shows the duct of FIG. 1 connected to a dryer via the duct connector ring and adaptor ring.
Figure 19A:
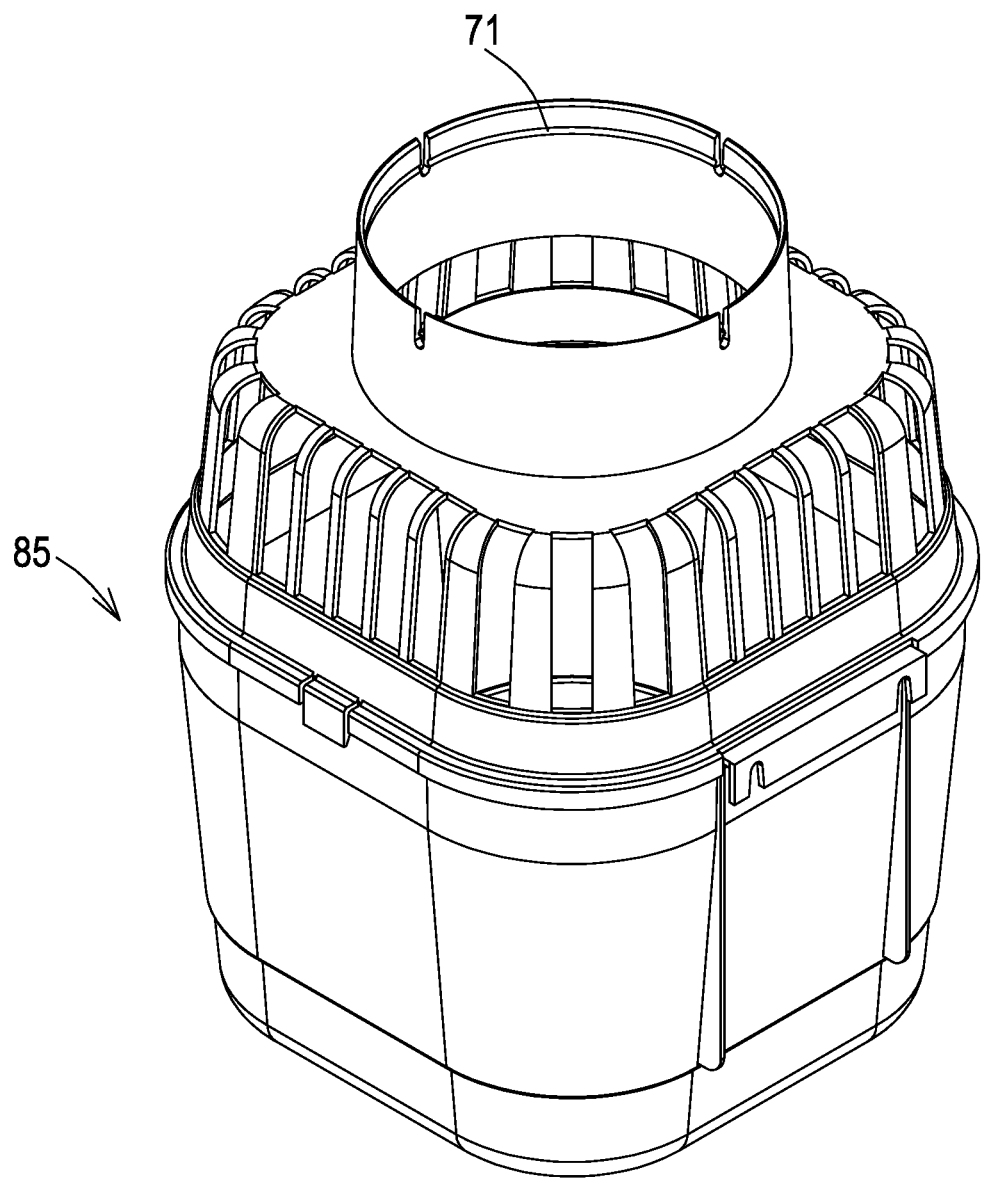
FIG. 19a shows a lint trap.
Figure 19B:
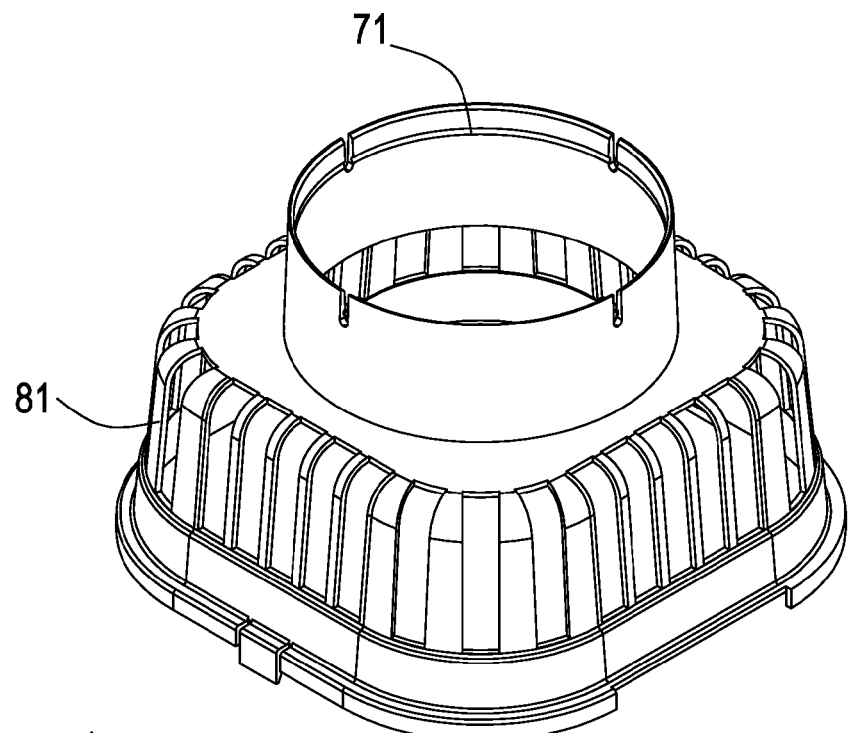
FIG. 19b shows the top part of the lint trap.
Figure 19C:
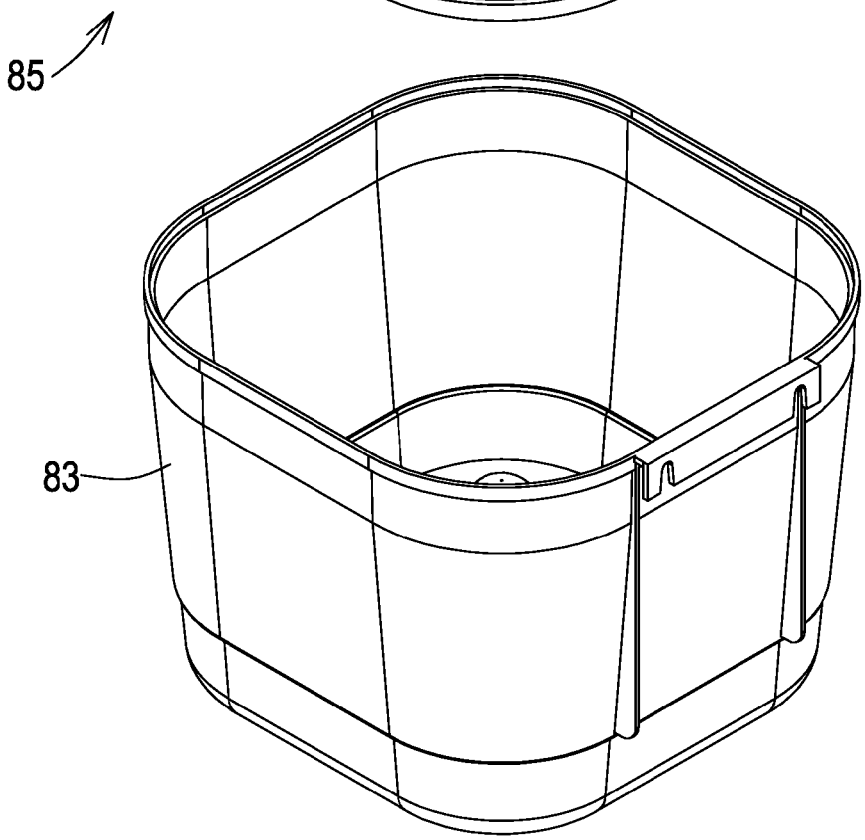
FIG. 19c shows the bottom part of the lint trap.
Figure 19D:
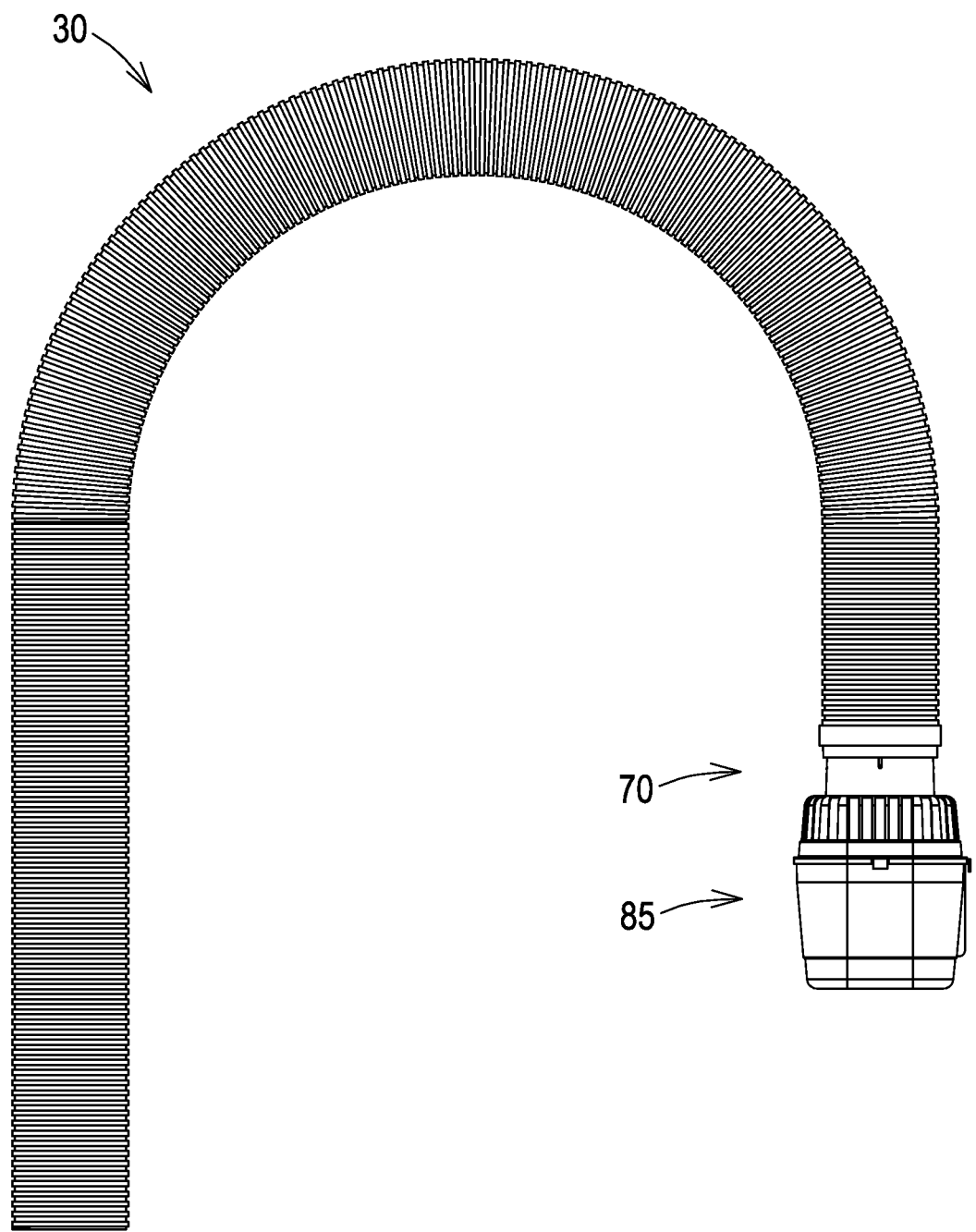
FIG. 19d shows the lint trap connected to the duct of FIG. 1.

Referring now to FIG. 18, there is shown a dryer 78 with two-piece connector 75, connected via the adaptor ring 72 to dryer exhaust port 80, and threaded on to duct 30 via the duct connector ring 70.

Referring now to FIGS. 19a-19d, there is shown a lint trap 85, comprised of top part 81 and bottom part 83, having an integrally formed adaptor ring 72, including annular groove 71, on the top part 81, for the purpose of connecting to duct connector ring 70 threaded onto duct 30. The lint trap 85 is used when the duct 30 has no access to the outside, for the purpose of providing housing for the lint that is released from duct 30, so as not to allow the lint to scatter around the vicinity of the dryer. The lint trap 85 can be hung on the wall, or placed on the floor.

Figure 20A:
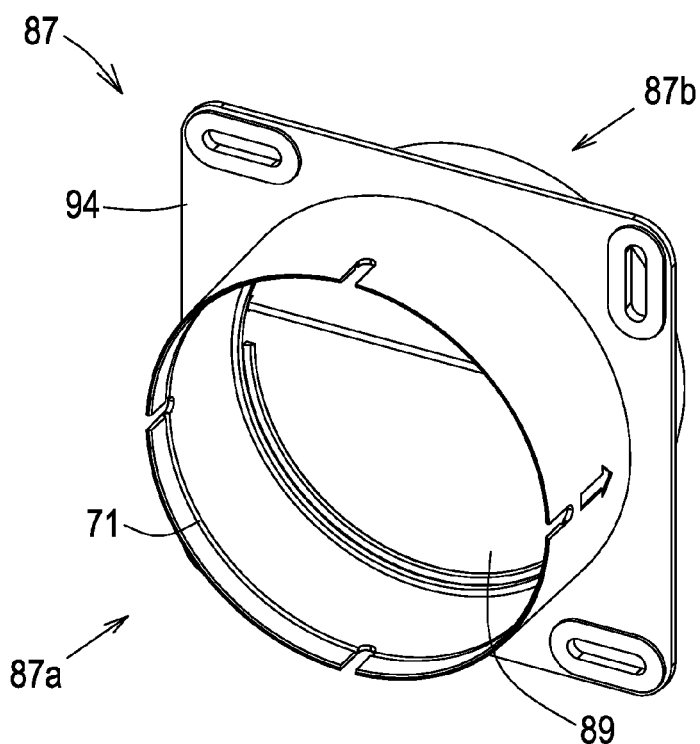
FIG. 20a is a perspective view of a draft blocker when the dryer is turned off.
Figure 20B:
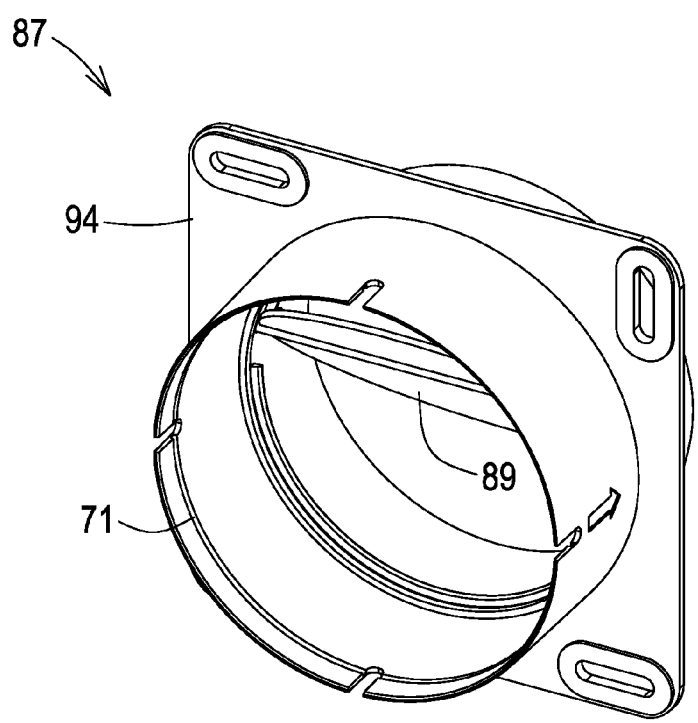

Referring now to FIGS. 20a-20b, there is shown a draft blocker 87 which is utilized for the exhaust on the end of duct 30, connecting it to the wall. The draft blocker 87 has an inlet section 87a, functioning as adaptor ring 72 for connecting to connector ring 70 threaded onto duct 30. The outlet section 87b on the other side of the draft blocker 87 is inserted through an opening in the wall. A flange 94 surrounding the draft blocker 87 is present for the purpose of hanging the draft blocker onto the wall. When the dryer 78 is turned on, a flap 89 situated vertically inside the blocker 87 blocking the air flow, is opened and thus allows the air to pass through in one direction, so not to allow air from the outside to penetrate the duct. When the dryer is stopped the flap closes, and no air will pass through.

Figure 21:
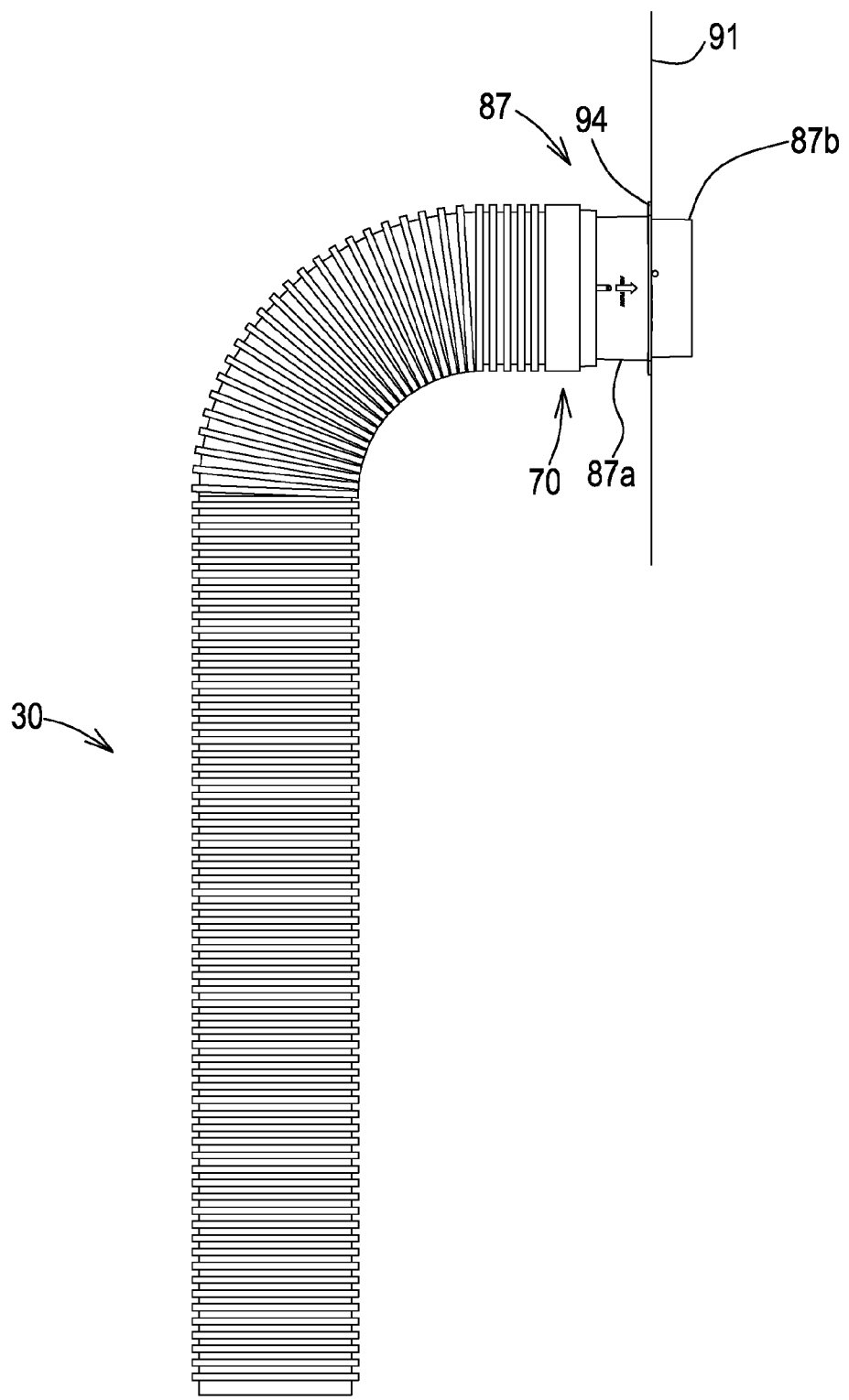
FIG. 21 is a perspective view of a duct connected to a partition via a draft blocker.

Referring now to FIG. 21, there is shown a duct 30 threaded onto duct connector ring 70, connected to draft blocker 87 inserted through a thin partition 91.

Figure 22:
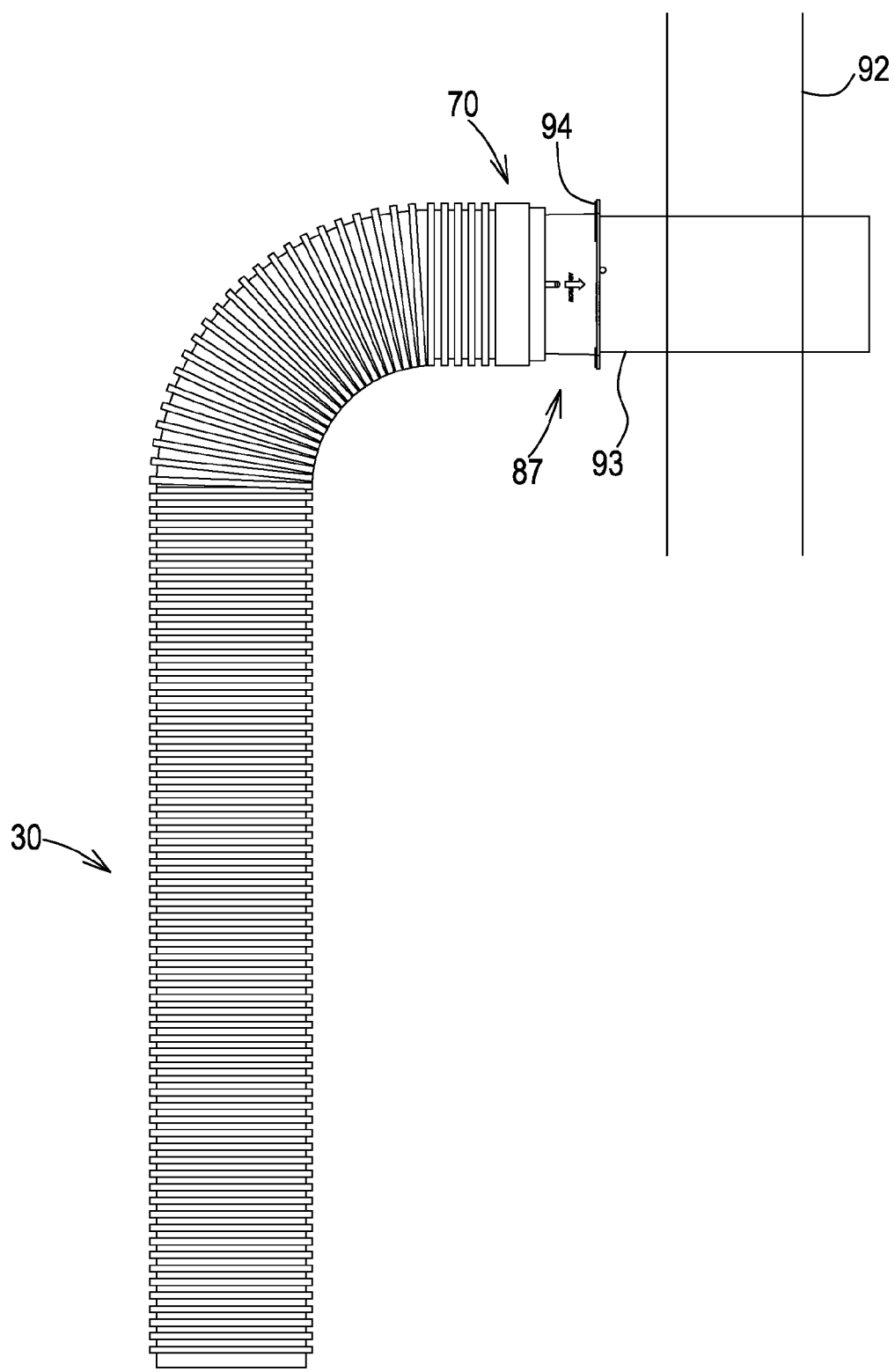
FIG. 22 is a perspective view of a duct connected to a wall via a draft blocker connected to a solid tube.

Referring now to FIG. 22, there is shown the duct 30 and draft blocker 87 of FIG. 18, inserted through a wall 92 via a long solid pipe 93, inserted on one end into the outlet section 87b of draft blocker 87, since the outlet section 87b is not long enough to extend all the way through a wall 92.

Figure 23:
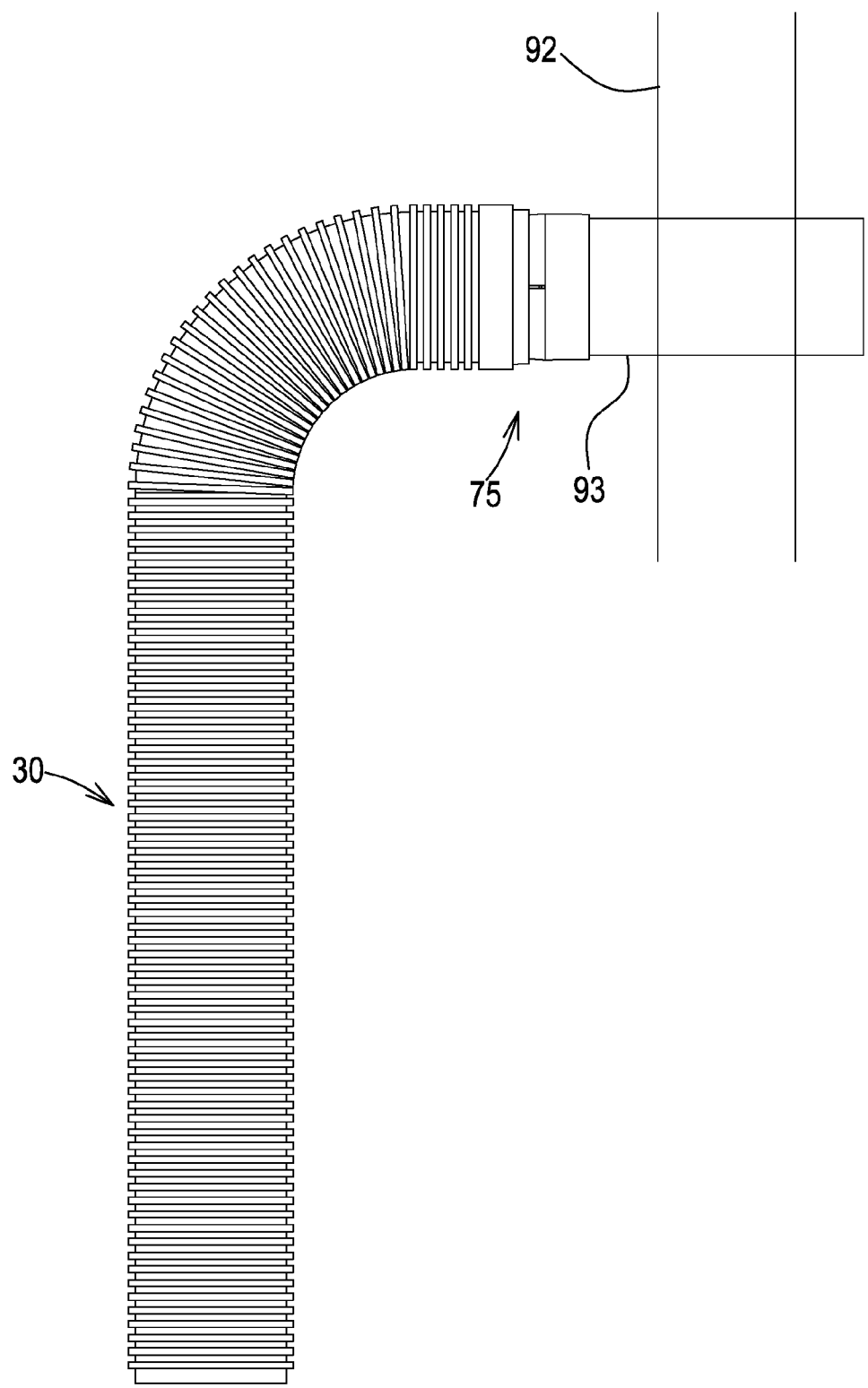
FIG. 23 is a perspective view of a duct connected to a wall via the adaptor ring and dryer connector connected to a solid tube.

Referring now to FIG. 23, there is shown the duct 30 threaded onto two-piece connector 75, connected to solid pipe 93 via the appliance connection side 72b. There is no draft blocker 87 involved in this option, thus air from the outside is allowed to enter the duct.

Referring now to FIGS. 24a-24c, there is shown the polygonal ducts of the present embodiment which may be manufactured in substantially the same manner as shown and described hereinabove in conjunction with FIGS. 7 and 9. In the present embodiment however, the cylindrical duct which results from the hitherto described method of manufacture is converted, either wholly or partially, into a polygonal duct, preferably square or rectangular.

Conversion of a length of cylindrical duct 30 may be achieved by mounting a length thereof onto an expanding metal profile 126, having an external shape adapted to expand to the shape and size desired. Once the duct 30 is mounted onto profile 126, the profile is operated as known in the art, so as to expand against the interior surface of the round duct, thereby to deform it into a predetermined shape. As seen in the drawings, it may also be desired to complement the outward deformation forces applied from the interior of the duct by the expanding metal profile 126, by external deformation forces, such as may be provided by trolley 128. Trolley 128 comprises a chassis 130, onto which are mounted a plurality of cylindrical wheels 132 which, as seen in FIG. 23C, define, together with wheels 132, internal right-angled profiles 134. As trolley 128 travels along the profile 126 and then engages duct 30, the duct is stretched both from the interior by profile 126, and is also squeezed between the profile 126 and the inward-facing right-angled profiles of trolley 128, thereby to impart to the duct a desired polygonal shape. In the present example, this shape is rectangular, but this is by way of example only, as it could be any desired shape, whether rectangular, or any other type of polygon. In accordance with an alternative embodiment of the invention, there may be provided an additional trolley in order to properly form the bottom corners of the polygonal duct.

Figure 26:
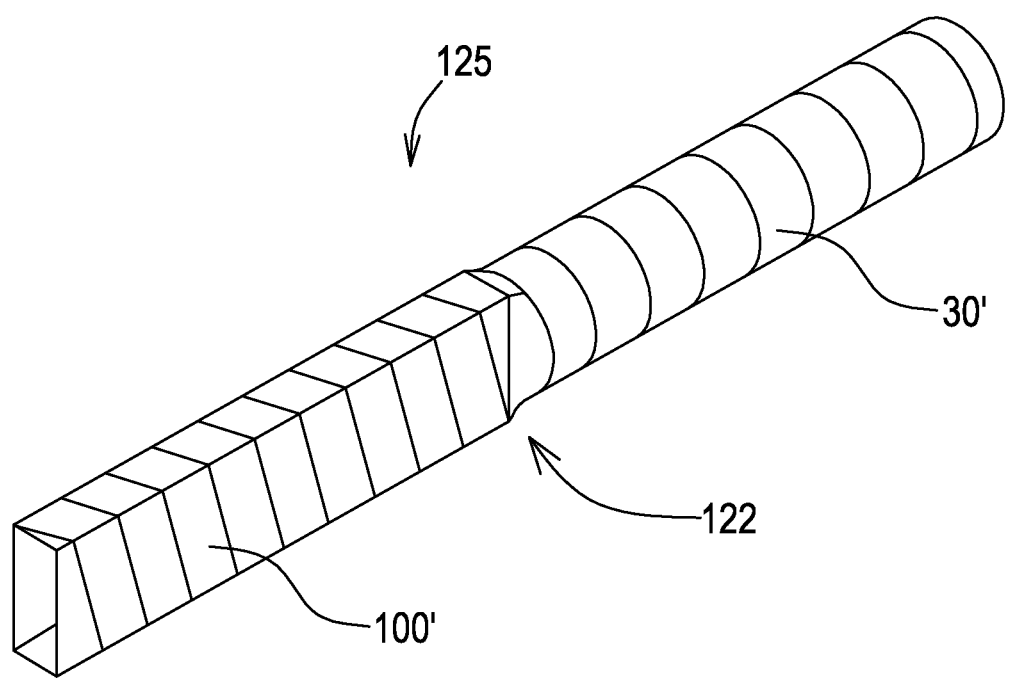
FIG. 26 is a pictorial representation of a compound duct.

Referring now to FIGS. 25a-25b, there are shown a perspective view and a side view, respectively, of a square duct 100 having a round two-piece connector 75 on both its ends;

Referring now to FIG. 26, there is seen a portion of a compound duct 125 which has both a cylindrical portion, referenced 30', substantially as shown and described above in conjunction with FIG. 2; and a square or rectangular portion, referenced 100', substantially as shown and described above in conjunction with FIGS. 25a-25b. The two differently shaped portions are connected via a transition portion 122. Typically, compound duct 125 is primarily cylindrical, and has a rectangular end portion so as to facilitate connection of the duct to the outlet ports of different types of gas emitting machines, wherein the outlet ports are square or rectangular. Use of the illustrated duct clearly avoids the necessity of unorthodox and sometimes unsafe connections, in order to connect a square or rectangular machine outlet to a cylindrical duct. The compound duct 125 may be formed as described above in conjunction with FIGS. 24a-24c, or by any other suitable method.

Clearly, also in accordance with the present invention, and referring also to FIG. 26, in the event that a cylindrical duct is to remain cylindrical but with a square or rectangular end only, such as for connection purposes to the outlet of a gas emitting machine, this will be done by mounting only that portion of the duct desired to be transformed, onto the expanding profile, thereby to obtain a rectangular or square portion, referenced 100' in FIG. 26.

It will further be appreciated by persons skilled in the art that the scope of the present invention is not limited by what has been specifically shown and described hereinabove, merely by way of example. Rather, the scope of the present invention is defined solely by the claims, which follow.

We claim:

1. A durable semi-rigid, flexible duct having an axis running the length of said duct, comprising:
    a single aluminum ribbon, having an innermost and outermost side;
    a resilient wound element, wherein said wound element is disposed at the mid point of the overlap region of said aluminum ribbon, such that said innermost side of said ribbon overlaps with the outermost side of a previous wrapping;
    wherein said wound element imparts corrugations to said aluminum ribbon, said aluminum ribbon being formed with a plurality of closely and evenly-spaced ridges embossed in between a pair of said corrugations, such that said duct is axially extendible between a compacted configuration suitable for storage and for shipping and an extended configuration suitable for installation in an air transport arrangement;
    wherein said aluminum ribbon is of a predetermined thickness rendering said duct substantially rigid when in said extended configuration and enabling said duct to maintain its substantial rigidity upon extension from said compacted configuration; and
    wherein said closely and evenly-spaced ridges impart additional rigidity to said duct, causing said duct to be resilient and withstand heavy impact forces, which might crush the duct and reduce its diameter.

2. The duct of claim 1, wherein said duct is in said extended configuration after having been compressed to said compacted configuration, wherein the relative length between them, is in a ratio which may vary in a range between 1:2.5 to 1:5, between said compacted configuration and said extended configuration, and said aluminum ribbon having an inward-facing surface being substantially smooth and featureless except for said wound corrugations and said closely and evenly-spaced ridges.

3. The duct of claim 1, wherein said aluminum foil ribbon layer is of a thickness in a range of 80 to 100 microns.

4. The duct of claim 3, wherein, when L=2 meters and d=10 centimeters, c≤0.001M, and wherein, when said duct is in said extended configuration upon extension from said compacted configuration, c≤0.003M.

5. The duct of claim 1, wherein said duct has a cross-sectional configuration selected from the group which consists of: a circular configuration, a polygonal configuration and a compound configuration wherein said duct is partially circular and partially polygonal.

6. The duct of claim 1, wherein, when a predetermined length L of said duct, of diameter d, is in the extended configuration and is disposed horizontally and supported at a first end thereof, said duct is operative to bend under the influence of gravitational force such that a second unsupported end thereof is lower than said first supported end by no more than y, such that (y/L)×100≤p, wherein p is a predetermined percentage of L.

7. The duct of claim 1, wherein, when a predetermined length L of said duct, of diameter d, is in the extended configuration and is disposed horizontally and supported at both ends thereof, said duct is operative to bend under the influence of gravitational force such that the central portion thereof is lower than the level of said supported ends by no more than c, such that (c/L)×100≤q, wherein q is a predetermined percentage of L.

8. The duct of claim 1, wherein said resilient wound element is fabricated of a metal having spring-like resilience.

9. The duct of claim 8, wherein said resilient wound element is a wound galvanized wire having a diameter in the range of 0.9 to 1.3 millimeters.

10. The duct of claim 1, wherein said duct is selected from the group which consists of: a gas transport duct; and a duct for enclosing utility supply lines.

11. The duct of claim 1, wherein said duct has a cross-sectional configuration selected from a group which consists of:
circular, polygonal, square; and rectangular configuration.

12. The duct of claim 1, wherein said closely and evenly-spaced ridges of said duct serve as threads that enable a screw-type connection.

13. The duct of claim 12, wherein said screw-type connection is provided by a duct connector ring comprising tooth-like projections matching said closely and evenly-spaced ridges of said duct, said projections provided on one side thereof, the other side thereof comprising means for connection to additional accessories.

14. The duct of claim 13, wherein said means for connection comprises an annular ridge, for connection to an adaptor ring formed with an annular groove on one side thereof, said groove matching said annular ridge of said duct connector ring, so that when said adaptor ring and said duct connector ring are brought together they connect via a snap-on connection between said annular ridge and said annular groove, and wherein the other side of said adaptor ring is the appliance connection side for connecting to at least one of a dryer and pipe.

15. The duct of claim 13, wherein said duct connector ring is connected to a lint trap, for the purpose of collecting lint that is released from said duct, so as not to allow said lint to scatter around the vicinity of the dryer, said lint trap comprising a top part having an integrally formed said adaptor ring, including said annular groove for connecting to said connector ring.

16. The duct of claim 15, wherein said duct connector ring is connected to a draft blocker which is utilized for the exhaust on the end of said duct, connecting it through a wall, said draft blocker comprising, an inlet section functioning as said adaptor ring for connecting to said connector ring threaded onto said duct.

17. A method for manufacturing a semi-rigid, flexible duct, comprising the steps of:
a) providing a mandrel of preselected diameter for fabricating a duct therearound;
b) providing a continuous aluminum ribbon, having an innermost and outermost side, of predetermined thickness;
c) wrapping said continuous ribbon with a predetermined overlap around said mandrel to form a sleeve, wherein said sleeve is formed by the overlap of said ribbon upon itself, such that said innermost side of said ribbon overlaps with the outermost side of a previous wrapping;
d) applying glue to said continuous ribbon for the bonding of said overlap, wherein said glue is cured by a drying drum;
e) winding a resilient wound element disposed at the mid point of said overlap of said aluminum ribbon, thereby to form a duct; and f) forming ridges on said aluminum ribbon by causing engagement of multiple ridged break-down wheels with a modified roller, while said aluminum ribbon is in between them, wherein said ridged break-down wheel is supported by a mounting arm external to said mandrel.

18. The method of claim 17, wherein said step e) of winding a wire includes the sub-step of aligning said wire with the overlap of said first ribbon so that the wire is approximately centered at the mid-point of the overlap of said aluminum ribbon.

19. The method of claim 17, wherein said step c) of winding said aluminum ribbon and said step e) of winding the wire, are performed by rotating said mandrel as said aluminum ribbon and the wire, are respectively taken up by said mandrel, continuously and with predetermined phase differences therebetween, with respect to the rotation of said mandrel.

20. The method of claim 17, wherein said step c) of winding said aluminum ribbon and said step e) of winding the wire are performed continuously and with a first preselected phase difference therebetween, with respect to the rotation of said mandrel.

21. The method of claim 17, wherein said modified roller of said step f) of forming ridges on said aluminum ribbon, is modified by adding circumferential grooves to the distal end of said roller, and wherein said grooves match said ridges on said break-down wheels, and wherein said grooves and said ridges mesh with each other by engagement, while said aluminum ribbon is in between them, thus forming said closely and evenly-spaced ridges on said aluminum ribbon.

22. The method of claim 17, wherein said arm supporting said break-down wheel is adjustably moved into position during the setup of said manufacturing process, and once established is maintained during production.

23. The method of claim 17, and further including, after said step e) of winding, the additional step of imparting to at least a portion of said duct, a polygonal cross-sectional configuration.

24. The method of claim 23, and wherein said additional step of imparting a polygonal cross-sectional configuration to at least a portion of said duct comprises imparting thereto a square or rectangular cross-sectional configuration.

25. The method of claim 17, wherein said aluminum ribbon maintains a substantially constant and identical tension, while being wrapped around said mandrel, in the range of 75-80 kgf, and wherein said wire is also maintained in the same said tension of said aluminum ribbon.

26. The method of claim 17, wherein said mandrel comprises a plurality of rollers each mounted so as to be individually rotatable on a fixed plate at a predetermined angle, each comprising a set of precision-shaped grooves for accepting said wire, and wherein said grooves are precision-spaced apart in order to accept a predetermined flow of said wire, established by said predetermined angle of said rollers, onto said mandrel, such that said wire becomes a spiral form within said duct being drawn off said mandrel in an automatic fashion.

27. The method of claim 26 wherein each of said rollers is mounted on said plate so as to provide a flexible spring-like action which absorbs any irregularities in said tension and irregularities associated with said wire and said ribbons.

* * * * *